(12) United States Patent
Niijima et al.

(10) Patent No.: US 11,912,366 B2
(45) Date of Patent: Feb. 27, 2024

(54) SADDLE-RIDE VEHICLE

(71) Applicant: HONDA MOTOR CO., LTD., Tokyo (JP)

(72) Inventors: Shun Niijima, Tokyo (JP); Takazumi Hayashi, Tokyo (JP); Koji Mizuta, Tokyo (JP); Takashi Takizawa, Tokyo (JP); Sakae Endo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 15 days.

(21) Appl. No.: 17/696,119

(22) Filed: Mar. 16, 2022

(65) Prior Publication Data
US 2022/0315150 A1  Oct. 6, 2022

(30) Foreign Application Priority Data

Mar. 31, 2021  (JP) .................................. 2021-062284

(51) Int. Cl.
*B62J 17/04*  (2006.01)

(52) U.S. Cl.
CPC ..................................... *B62J 17/04* (2013.01)

(58) Field of Classification Search
CPC ............. B62J 17/04; B62J 17/06; B62J 17/02
See application file for complete search history.

(56) References Cited

U.S. PATENT DOCUMENTS

| 10,399,628 B2 * | 9/2019 | Seidl ...................... B62K 19/48 |
| D929,907 S * | 9/2021 | Kuriki .......................... D12/114 |
| 2007/0069545 A1 | 3/2007 | Katagiri et al. |
| 2012/0139226 A1 * | 6/2012 | Yanagita ................... B62J 17/02  180/296 |
| 2016/0280059 A1 * | 9/2016 | Hagimoto ................ B62J 17/02 |
| 2017/0183059 A1 * | 6/2017 | Yamamoto ............... B62J 17/10 |
| 2019/0063301 A1 * | 2/2019 | Morotomi ............. B60K 13/04 |
| 2019/0302452 A1 * | 10/2019 | Nishida ..................... B62J 17/04 |
| 2021/0114452 A1 * | 4/2021 | Naruoka .................. B62J 41/00 |
| 2021/0300500 A1 * | 9/2021 | Neice ..................... B62K 17/00 |
| 2022/0315150 A1 * | 10/2022 | Niijima .................... B62J 17/04 |

FOREIGN PATENT DOCUMENTS

| EP | 2 562 069 A2 | 2/2013 |
| EP | 2 949 567 A1 | 12/2015 |
| JP | H11-79034 A | 3/1999 |
| JP | 2010-159042 A | 7/2010 |
| JP | 2010-234901 | 10/2010 |
| JP | 2012-121418 A | 6/2012 |
| JP | 2013-43547 A | 3/2013 |

(Continued)

OTHER PUBLICATIONS

German Office Action dated Sep. 20, 2022 issued in corresponding German application No. 10 2022 106 756.4; 4 pages.

(Continued)

*Primary Examiner* — Amy R Weisberg
*Assistant Examiner* — Sara Laghlam
(74) *Attorney, Agent, or Firm* — Rankin, Hill & Clark LLP

(57) ABSTRACT

A saddle-ride vehicle is a saddle-ride vehicle, in which at least a part of a side surface of an engine is exposed, which includes a windshield located in front of feet of a rider, in which the windshield is located on a the side surface of a crankcase of the engine and is supported only by the crankcase.

2 Claims, 20 Drawing Sheets

(56) References Cited

FOREIGN PATENT DOCUMENTS

| JP | 2014-43808 A | | 3/2014 |
|---|---|---|---|
| JP | 2014043808 A | * | 3/2014 |
| JP | 2017-119478 A | | 7/2017 |

OTHER PUBLICATIONS

Indian Office Action dated Oct. 28, 2022 issued in corresponding Indian application No. 202214015847; English translation included (5 pages).
Japanese Office Action dated Jan. 10, 2023 issued in corresponding Japanese application No. 2021-062284; English machine translation included (9 pages).

* cited by examiner

SADDLE-RIDE VEHICLE

INCORPORATION BY REFERENCE

The present application claims priority under 35 U.S.C. § 119 to Japanese Patent Application No. 2021-062284 filed on Mar. 31, 2021. The content of the application is incorporated herein by reference in its entirety.

BACKGROUND OF THE INVENTION

Field of the Invention

The present invention relates to a saddle-ride vehicle.

Description of the Related Art

In the related art, a saddle-ride vehicle including a cowl covering a side of an engine and including a windshield provided at the cowl to reduce exposure of feet of a rider to wind is known (see Japanese Patent Laid-Open No. 2010-234901, for example).

However, some saddle-ride vehicles may not include cowls provided on sides of engines, and it is desirable that the vehicles with no cowls covering the sides of the engines have a structure for reducing exposure of feet of riders to wind.

The present invention was made in view of the aforementioned circumstances, and an object thereof is to provide a saddle-ride vehicle capable of easily mounting a windshield and effectively reducing exposure of a rider to wind even in a case of a saddle-ride vehicle with no cowl covering a side of an engine.

SUMMARY OF THE INVENTION

A saddle-ride vehicle is a saddle-ride vehicle, in which at least a part of a side surface of an engine is exposed, which includes a windshield located in front of feet of a rider, in which the windshield is located on the side surface of a crankcase of the engine and is supported only by the crankcase.

It is possible to easily mount a windshield and to effectively reduce exposure of a rider to wind even in a saddle-ride vehicle with no cowl covering a side of an engine.

DETAILED DESCRIPTION OF THE PREFERRED EMBODIMENTS

Figure 1:
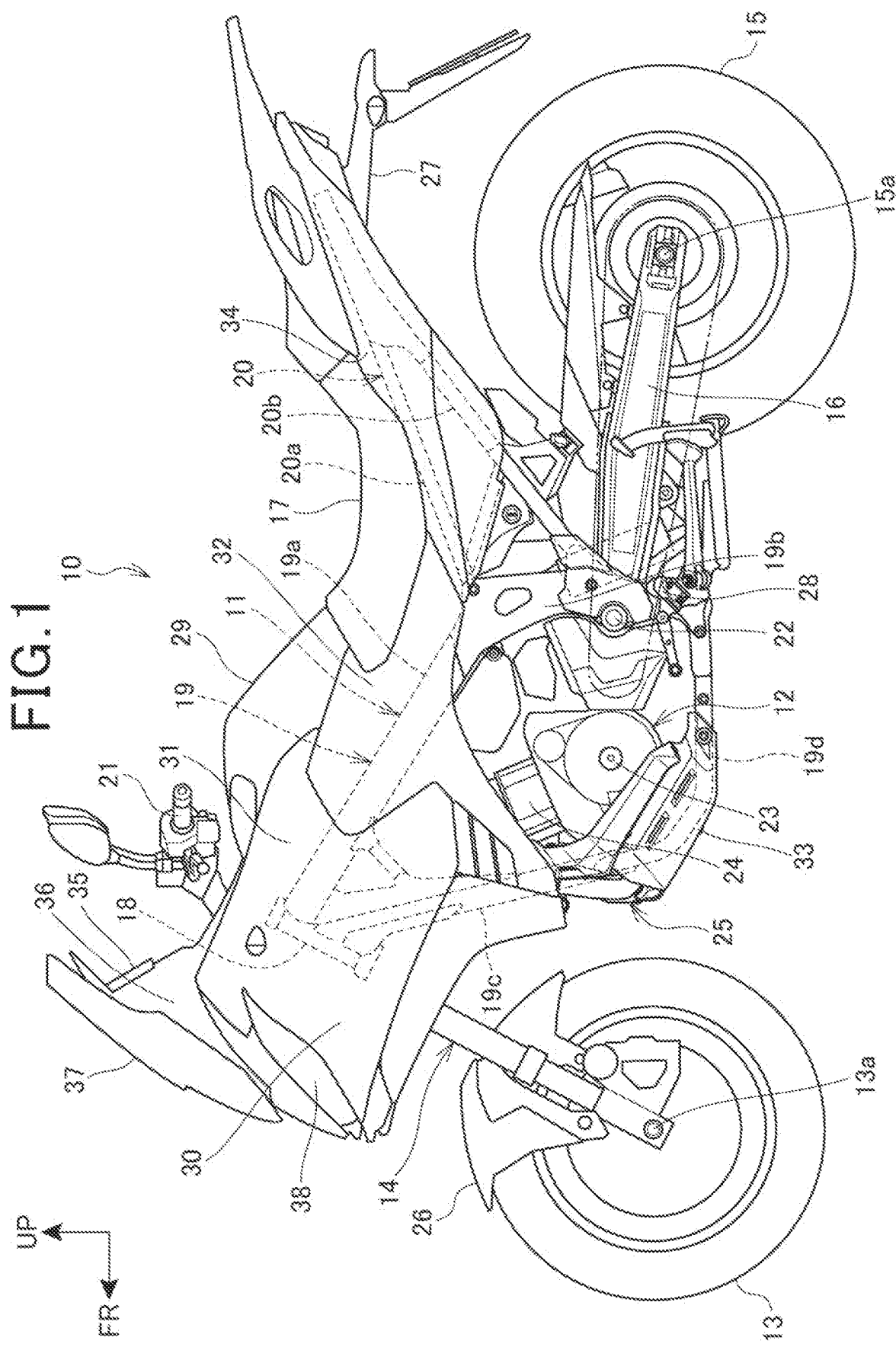
FIG. 1 is a side view of a saddle-ride vehicle according to an embodiment of the invention.

An embodiment of the present invention will be described below with reference to the drawings. Unless otherwise mentioned, directions including front-rear, left-right, and up-down mentioned in the description are the same as those directions relative to a vehicle body. Reference signs FR, UP, and LH shown in the drawings indicate a vehicle body front side, a vehicle body upper side, and a vehicle body left side, respectively.

Embodiment

FIG. 1 is a side view of a saddle-ride vehicle 10 according to an embodiment of the present invention.

The saddle-ride vehicle 10 is a vehicle including a vehicle body frame 11, a power unit 12 supported on the vehicle body frame 11, a front fork 14 that supports a front wheel 13 in a steerable manner, a swing arm 16 that supports a rear wheel 15, and a seat 17 for a rider.

The saddle-ride vehicle 10 is a vehicle on which the rider sits astride the seat 17. The seat 17 is provided above a rear part of the vehicle body frame 11.

The vehicle body frame 11 includes a head pipe 18 provided at a front end portion of the vehicle body frame 11, a front frame 19 located on a rear side of the head pipe 18, and a rear frame 20 located on a rear side of the front frame 19. A front end portion of the front frame 19 is connected to the head pipe 18.

The seat 17 is supported on the rear frame 20.

The front fork 14 is supported on the head pipe 18 in such a manner that it can be steered left and right. The front wheel 13 is supported on an axle 13a provided at a lower end portion of the front fork 14. A handle 21 for steering that the rider grasps is mounted at an upper end portion of the front fork 14.

The swing arm 16 is supported on a pivot shaft 22 that is supported on the vehicle body frame 11. The pivot shaft 22 is a shaft extending horizontally in a vehicle width direction.

The pivot shaft 22 is passed through a front end portion of the swing arm 16. The swing arm 16 swings up and down around the pivot shaft 22.

The rear wheel 15 is supported on an axle 15a provided at a rear end portion of the swing arm 16.

The power unit 12 is disposed between the front wheel 13 and the rear wheel 15 and supported on the vehicle body frame 11.

The power unit 12 is an internal combustion engine. The power unit 12 includes a crankcase 23 and a cylinder 24 that houses a reciprocating piston. An exhaust device 25 is connected to an exhaust port of the cylinder 24.

An output of the power unit 12 is transmitted to the rear wheel 15 through a drive power transmission member that connects the power unit 12 and the rear wheel 15 to each other.

The saddle-ride vehicle 10 further includes a front fender 26 that covers the front wheel 13 from above, a rear fender 27 that covers the rear wheel 15 from above, footrests 28 on which the rider places his or her feet, and a fuel tank 29 that stores fuel to be used by the power unit 12.

The front fender 26 is mounted on the front fork 14. The rear fender 27 and the footrests 28 are provided on a lower side relative to the seat 17. The fuel tank 29 is supported on the vehicle body frame 11.

In the present embodiment, the front frame 19 includes a pair of left and right main frames 19a extending on the rear lower side from the head pipe 18, pivot frames 19b extending on the lower side from rear end portions of the main frames 19a, a down frame 19c extending on the lower side from a position of the head pipe 18 below front ends of the main frames 19a; and a pair of left and right lower frames 19d extending on the rear lower side from a lower end of the down frame 19c, then extending on the rear side, and connected to lower end portions of the pivot frames 19b.

The rear frame 20 includes a pair of left and right seat frames 20a extending upward on the rear side from upper portions of the left and right pivot frames 19b up to a vehicle end portion and a pair of left and right rear sub-frames 20b extending from an intermediate portions of the left and right pivot frames 19b in the up-down direction to rear end portions of the seat frames 20a.

Figure 2:
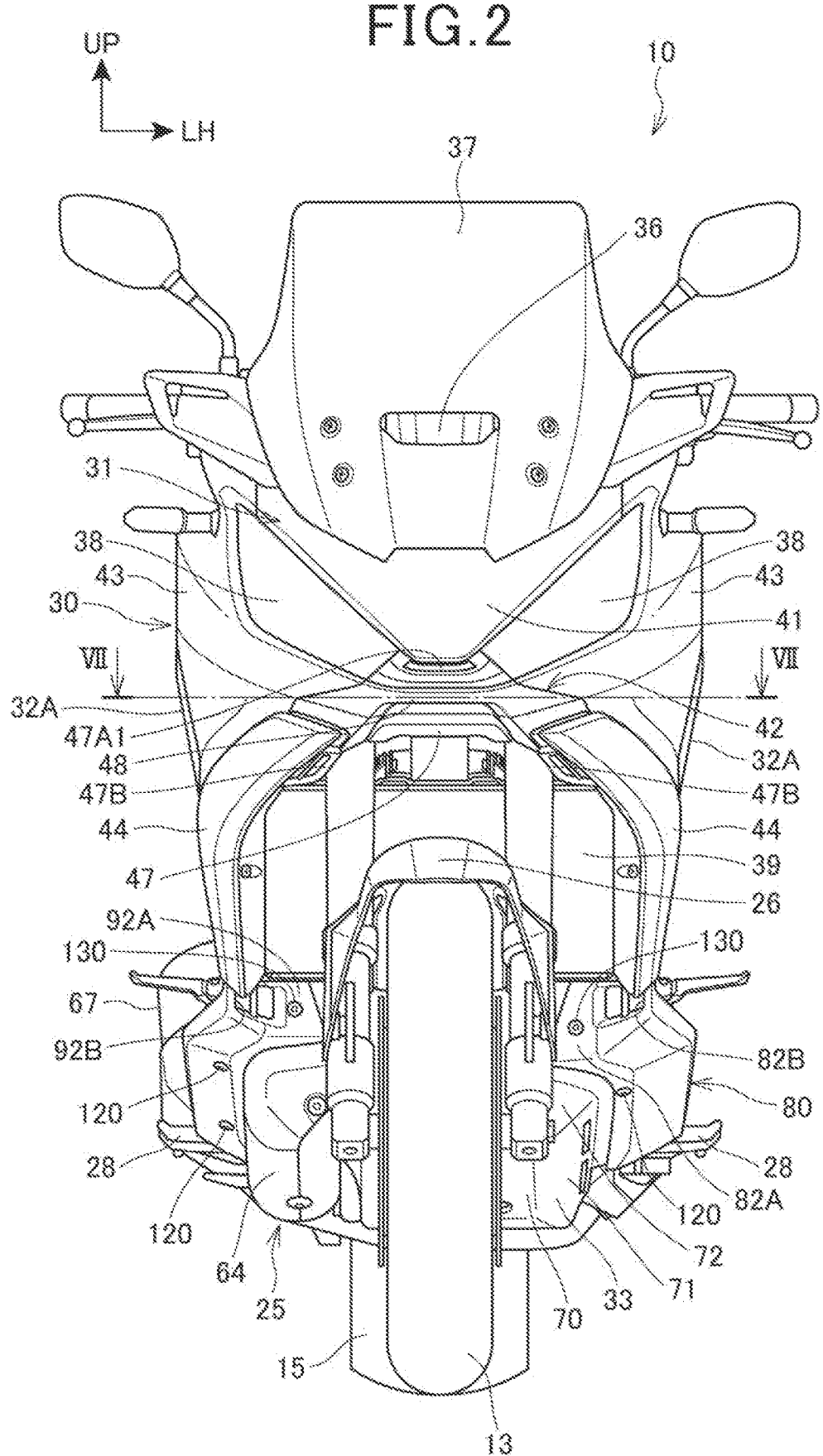
FIG. 2 is a front view of the saddle-ride vehicle according to the embodiment of the invention.

FIG. 2 is a front view of the saddle-ride vehicle 10 according to the embodiment of the invention.

As illustrated in FIGS. 1 and 2, the saddle-ride vehicle 10 includes a vehicle body cover (cowl) 30 covering the vehicle body that is constituted by the vehicle body frame 11, the power unit 12, and the like.

The vehicle body cover 30 includes a front cowl 31 covering the head pipe 18 and an upper portion of the front fork 14 from the front side and left and right sides and a pair of left and right side covers 32 covering the side surface of the fuel tank 29 from the outer side behind the front cowl 31.

Also, the vehicle body cover 30 includes an undercover 33 covering the crankcase 23 from the lower side and a pair of left and right rear covers 34 covering a lower portion of the seat 17 from sides behind the side covers 32.

A meter visor 36 covering a meter 35 is provided at an upper portion of the front cowl 31. The meter visor 36 is provided with a wind screen 37 with a plate shape extending upward on the rear side.

The front cowl 31 is provided with a pair of left and right headlights 38. A radiator 39 (see FIG. 2) is disposed in a space covered with the front cowl 31.

Figure 3:
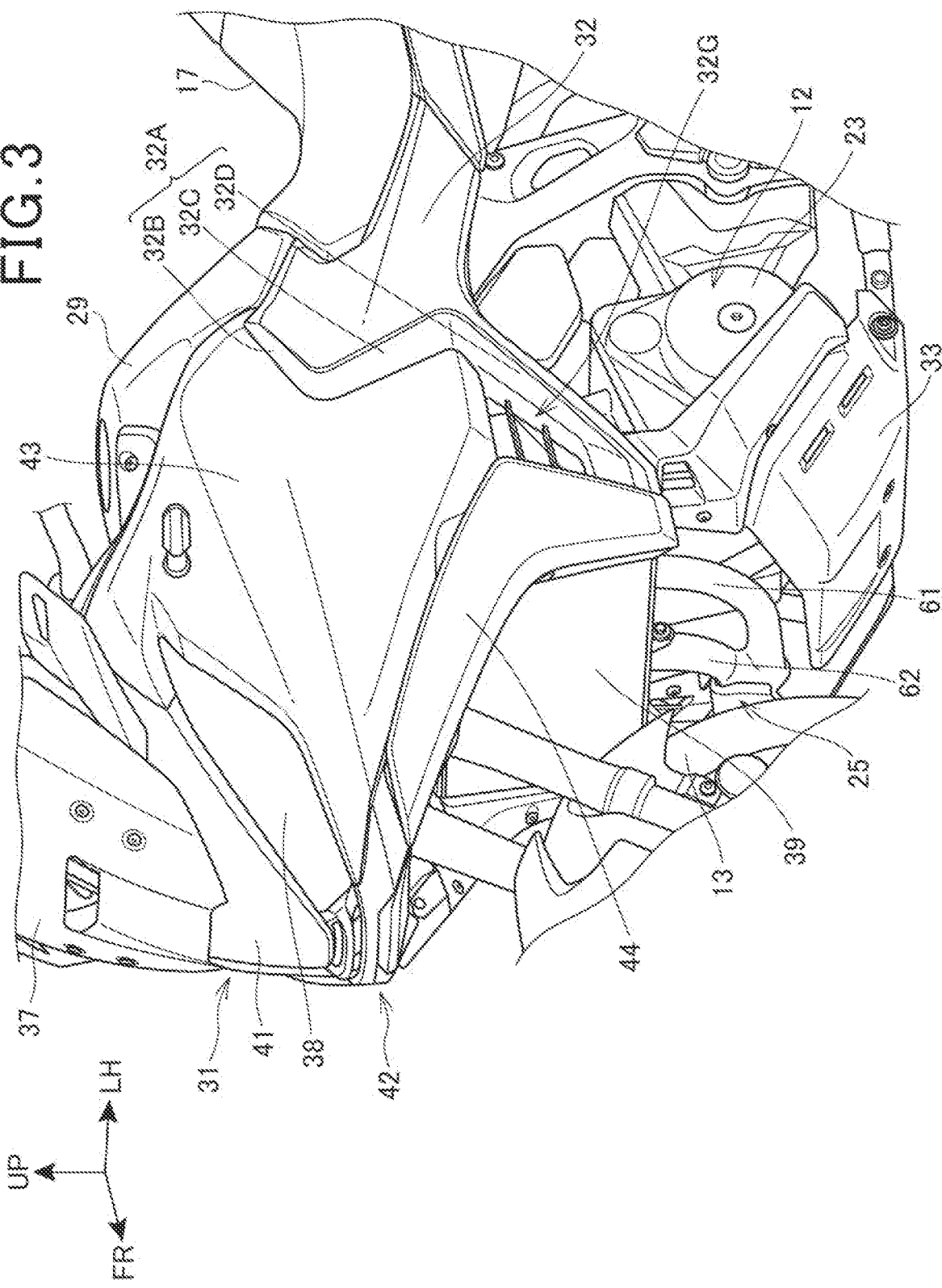
FIG. 3 is a perspective view of the saddle-ride vehicle from a left front side according to the embodiment of the invention.
Figure 4:
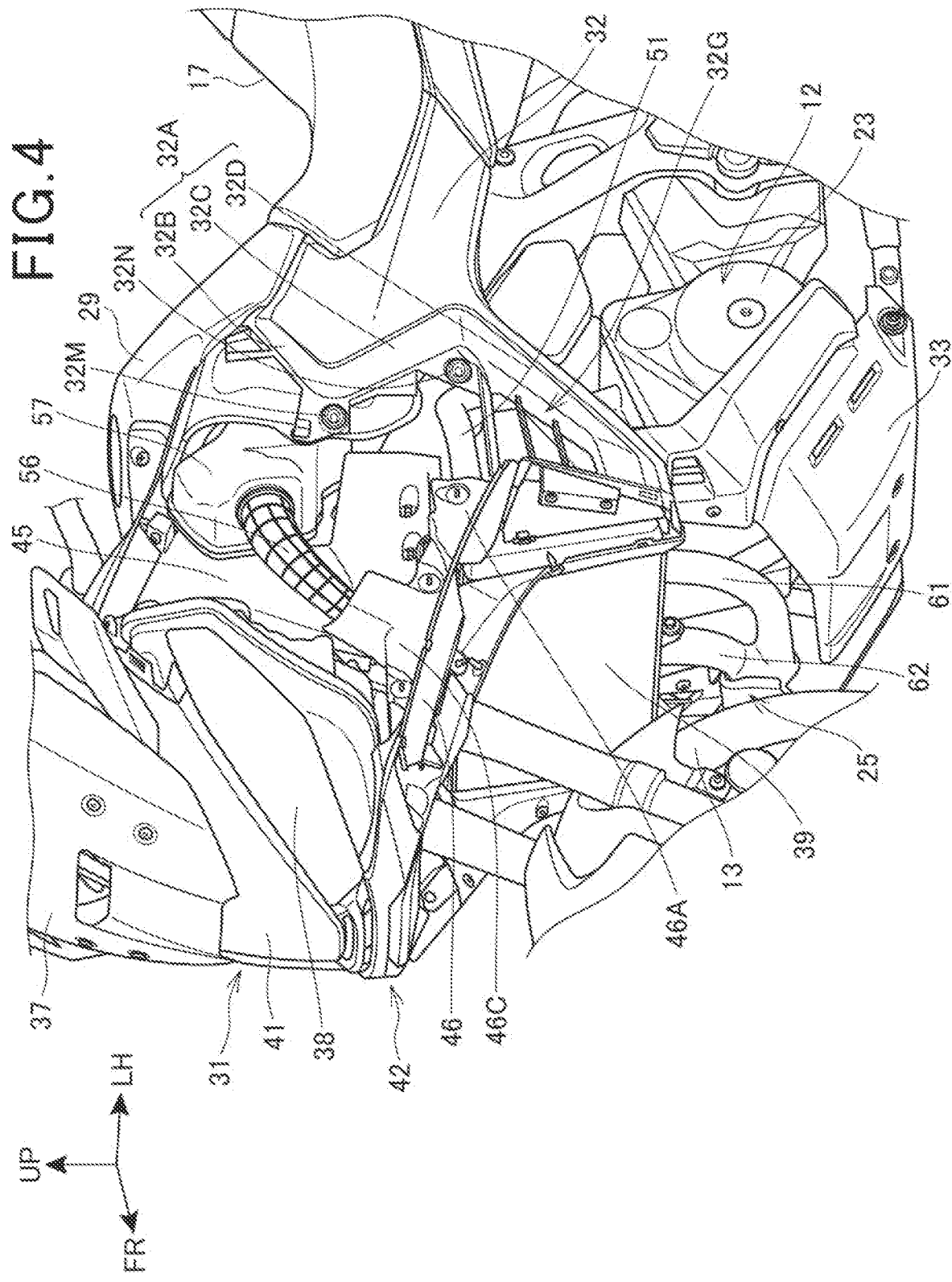
FIG. 4 is a diagram in which illustration of a front-side cowl and a front lower cowl is omitted from FIG. 3.

FIG. 3 is a perspective view of the saddle-ride vehicle 10 from the left front side according to the embodiment of the invention. FIG. 4 is a diagram in which illustration of front side cowls 43 and front lower cowls 44 is omitted from FIG. 3.

The front cowl 31 includes a front upper cowl 41 covering an upper side of the headlights 38, a front front-end cowl 42 covering a front end portion of the saddle-ride vehicle 10 below the headlights 38, a pair of left and right front side cowls 43 extending on the rear side from the headlights 38, a pair of left and right front lower cowls 44 covering the lower sides of the front side cowls 43, an inner cover 45 (see FIG. 4) covered with the front upper cowl 41, the front front-end cowl 42, the front side cowls 43, and the front lower cowls 44, and connection covers 46 (see FIG. 4) connecting the front front-end cowl 42 to the side covers 32 with the outer sides thereof covered with the front side cowls 43.

As illustrated in FIG. 2, the front upper cowl 41 is formed to be substantially horizontally symmetrical. The front upper cowl 41 has a substantially V-shaped strip shape in a front view. The front upper cowl 41 extends upward on the rear side in a side view.

Figure 5:
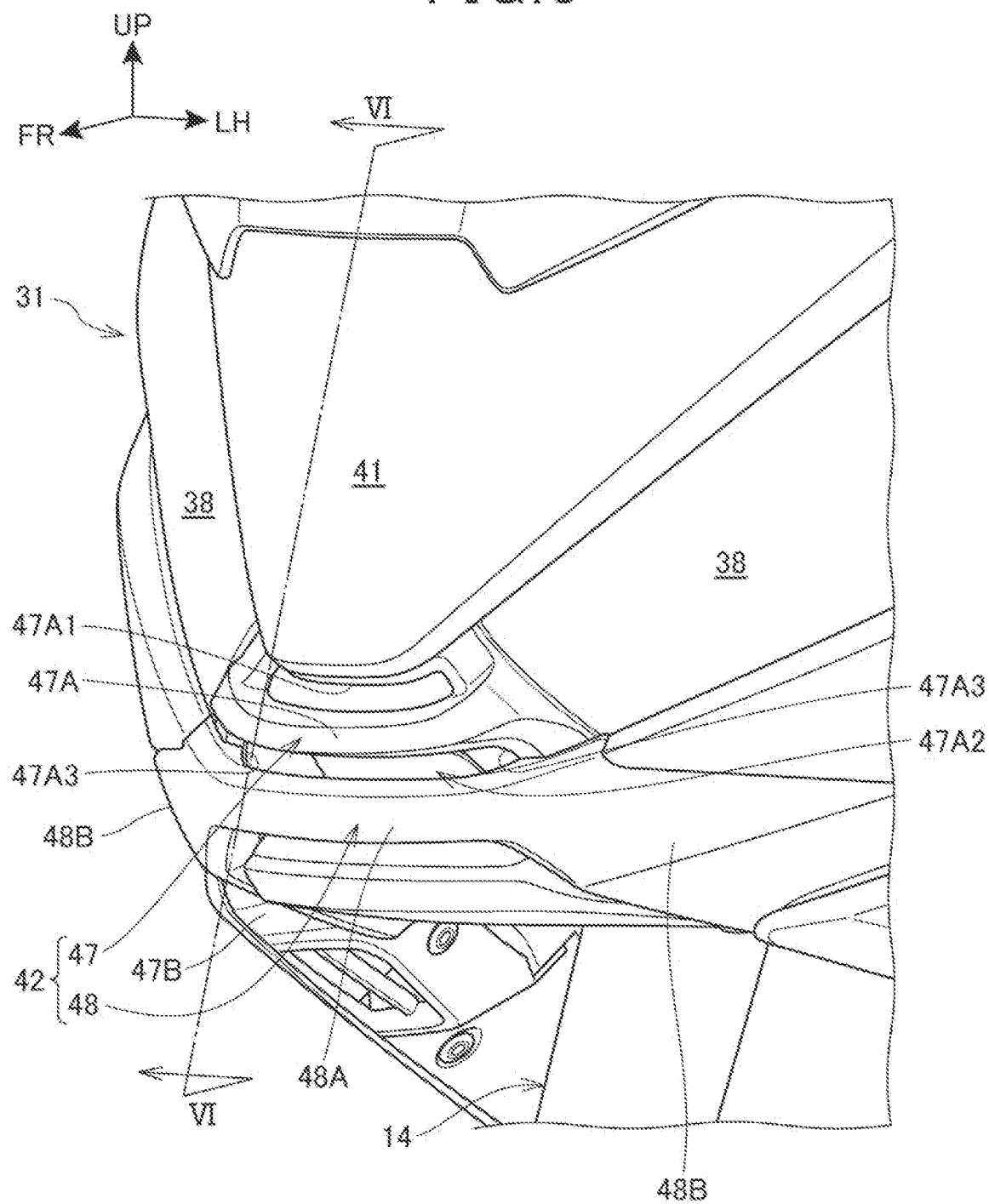
FIG. 5 is a perspective view of the saddle-ride vehicle when seen from a left front side, which illustrates a peripheral portion of a front front-end cowl.
Figure 6:
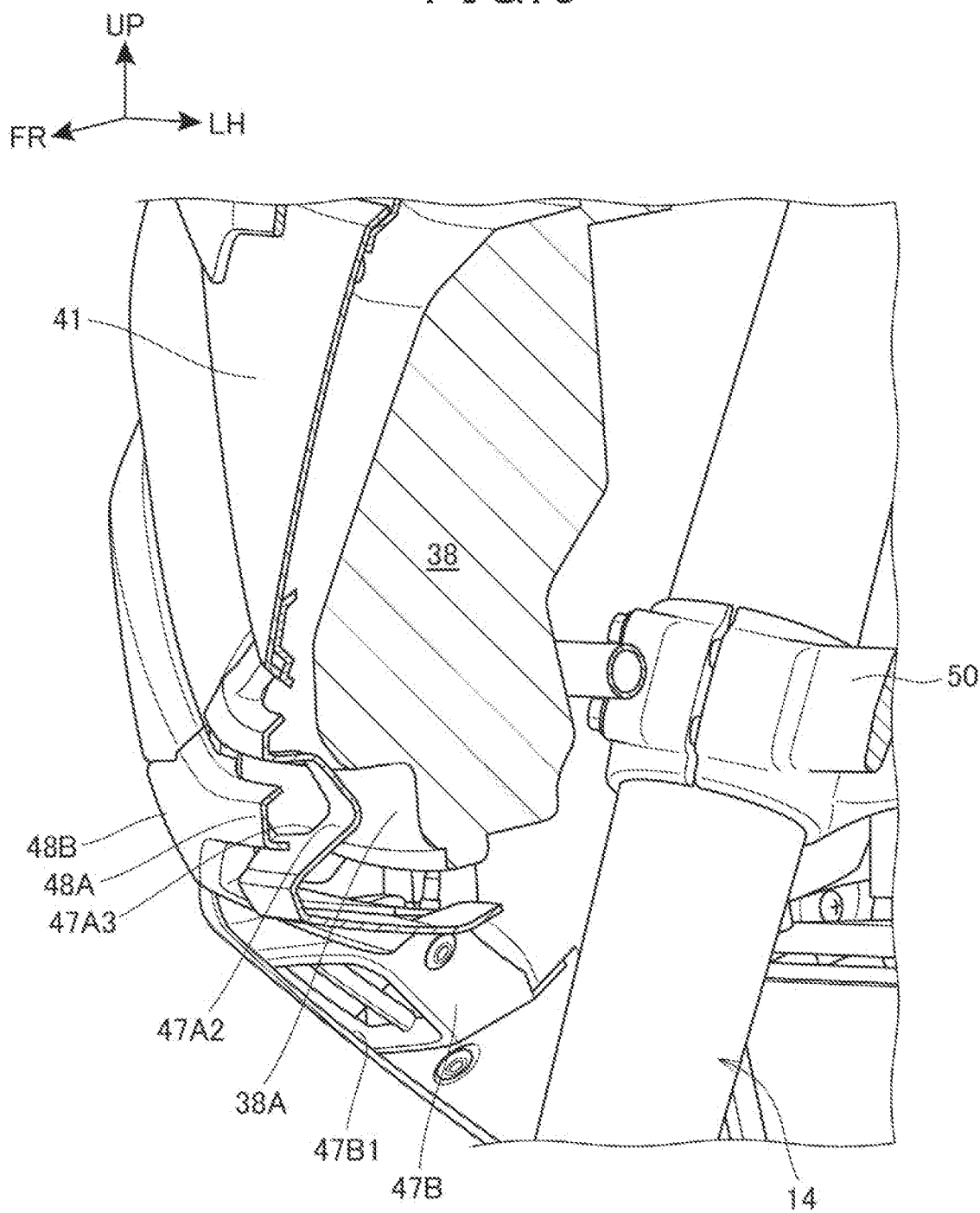
FIG. 6 is a sectional view along the line VI-VI in FIG. 5.
Figure 7:
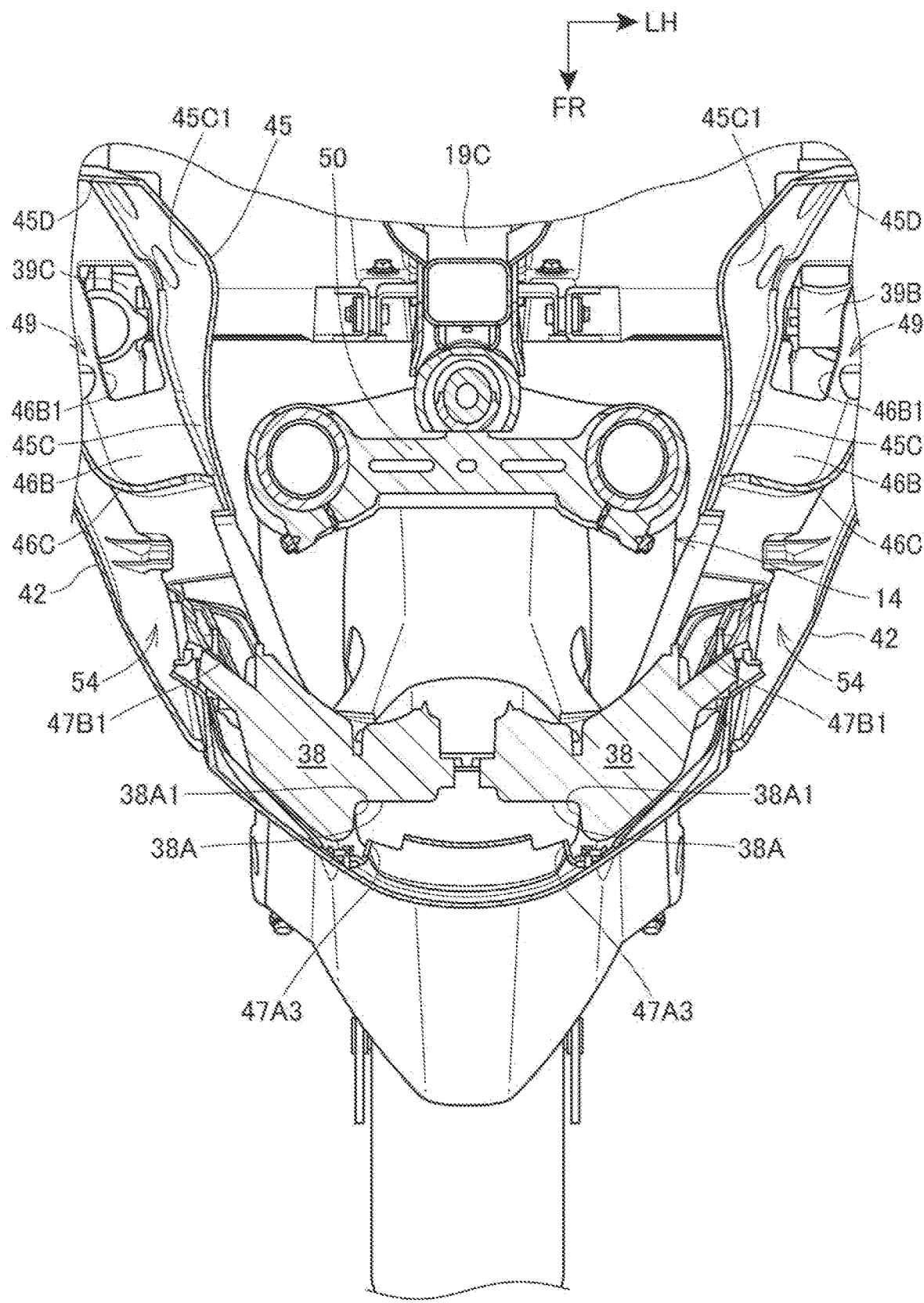
FIG. 7 is a sectional view along the line VII-VII in FIG. 2.

FIG. 5 is a perspective view of the saddle-ride vehicle 10 when seen from the left front side, which illustrates a peripheral portion of the front front-end cowl 42. FIG. 6 is a sectional view along the line VI-VI in FIG. 5. FIG. 7 is a sectional view along the line VII-VII in FIG. 2.

The front front-end cowl 42 covers the lower side of the left and right headlights 38. The front front-end cowl 42 includes a front end inner 47 covering a portion between the left and right headlights 38 and a front end outer 48 disposed in front of the front end inner 47.

The front end inner 47 is formed into a substantially inverted U shape in a front view (see FIG. 2). The front end inner 47 includes a center portion 47A disposed between the left and right headlights 38 and a pair of left and right side portions 47B extending on the rear side from both left and right sides of the center portion 47A. The side portions 47B have a thickness in the up-down direction as a whole.

The center portion 47A is formed into a quadrangular shape in a front view (see FIG. 2). An upper portion opening 47A1 penetrating in the front-rear direction is formed at an upper portion of the center portion 47A. The upper portion opening 47A1 extends in the vehicle width direction (left-right direction). A recessed portion 47A2 recessed on the rear side is formed below the upper portion opening 47A1. The recessed portion 47A2 extends in the vehicle width direction along the upper portion opening 47A1. Lower portion openings 47A3 penetrating through the center portion 47A in the thickness direction are formed at outer ends of the recessed portion 47A2 in the vehicle width direction. The left and right lower portion openings 47A3 open to face the front surfaces of the left and right headlights 38, respectively.

Guide walls 38A with L-shaped sections are formed on the front surfaces of the headlights 38 as illustrated in FIG. 6. Outer ends 38A1 of the guide walls 38A in the vehicle width direction are disposed further outward than the lower portion openings 47A3 in the vehicle width direction.

The front end outer 48 is disposed at the recessed portion 47A2 as illustrated in FIG. 5. The front end outer 48 includes a bridge portion 48A extending along the recessed portion 47A2 and securing portions 48B provided at both left and right ends of the bridge portion 48A. The left and right securing portions 48B have plate shapes extending on the rear side toward the outer sides in the vehicle width direction. The left and right securing portions 48B are secured to the front end inner 47, and the front end outer 48 is supported by the vehicle body. The bridge portion 48A of the front end outer 48 is formed to have a narrower width than the recessed portion 47A2 in the up-down direction and is separated from a bottom surface (inner surface) of the recessed portion 47A2.

Therefore, if running wind hits the front front-end cowl 42, then the running wind enters a gap between the front end outer 48 and the front end inner 47 and is then guided to left and right sides by the bottom surface of the recessed portion 47A2. The running wind guided to the left and right sides by the recessed portion 47A2 flows further backward than the front end inner 47 through the lower portion openings 47A3. The running wind that has flowed to the rear side of the front end inner 47 is guided to the inner side in the vehicle width direction by the guide walls 38A of the headlights 38, then passes between the left and right headlights 38, and flows to the rear side through the center portion in the vehicle width direction. The running wind passing through the lower portion openings 47A3 of the front front-end cowl 42 enters the inside of the front cowl 31 while meandering. Note that the head pipe 18 and the down frame 19c are located at the center portion in the vehicle width direction.

A front end portion of the inner cover 45 (see FIG. 4) is engaged with front portions of the side portions 47B of the front end inner 47. Also, front end portions of the front lower cowls 44 (see FIG. 3) are engaged with the front portions of the side portions 47B. Intake openings 47B1 (see FIG. 6) are formed at rear portions of the side portions 47B. The intake openings 47B1 take running wind into a wind guide path 54 formed by a space sandwiched by the front side cowls 43 and the inner cover 45.

Figure 8:
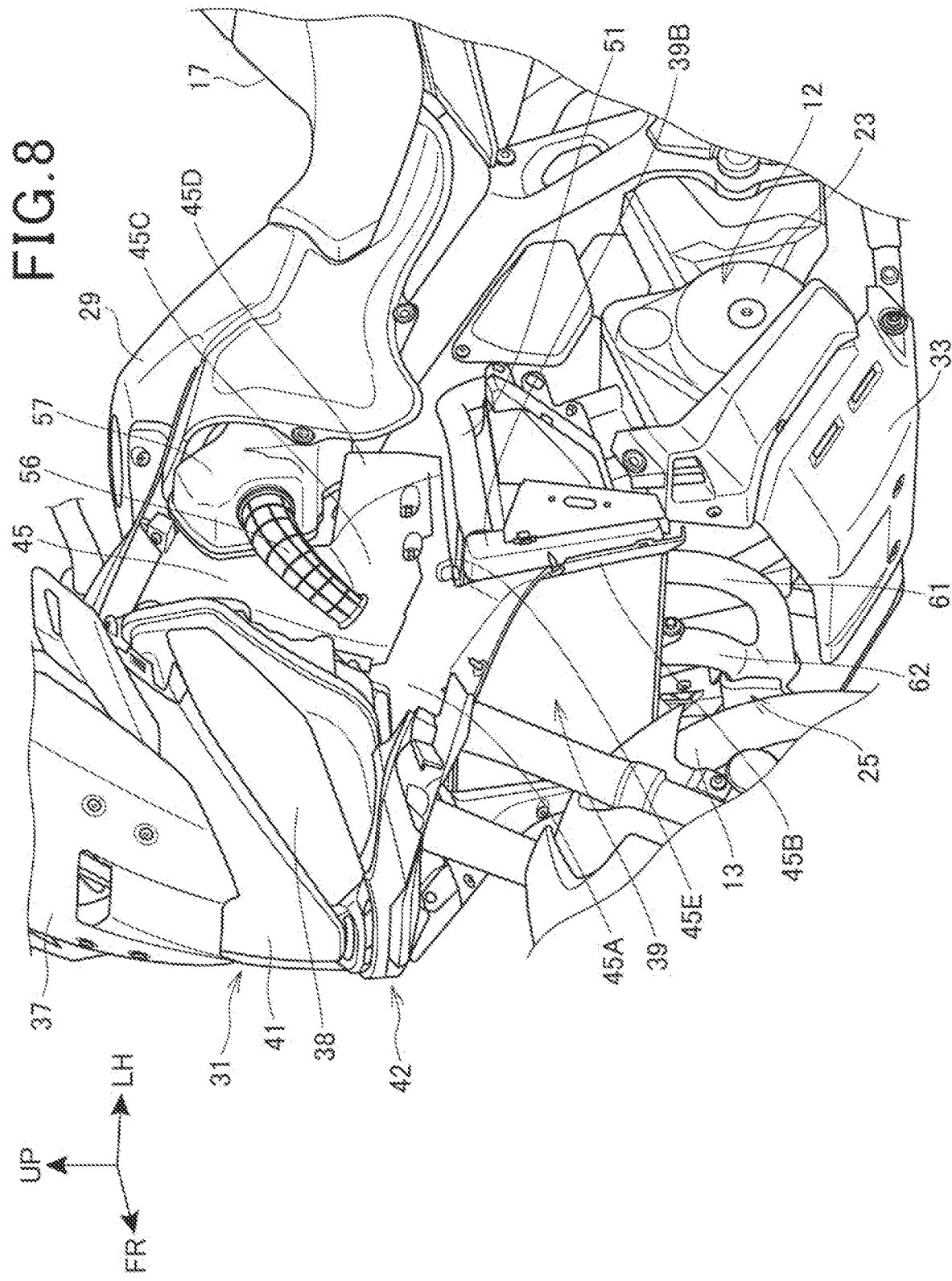
FIG. 8 is a diagram in which illustration of a connection cover and a side cover is omitted from FIG. 4.
Figure 9:
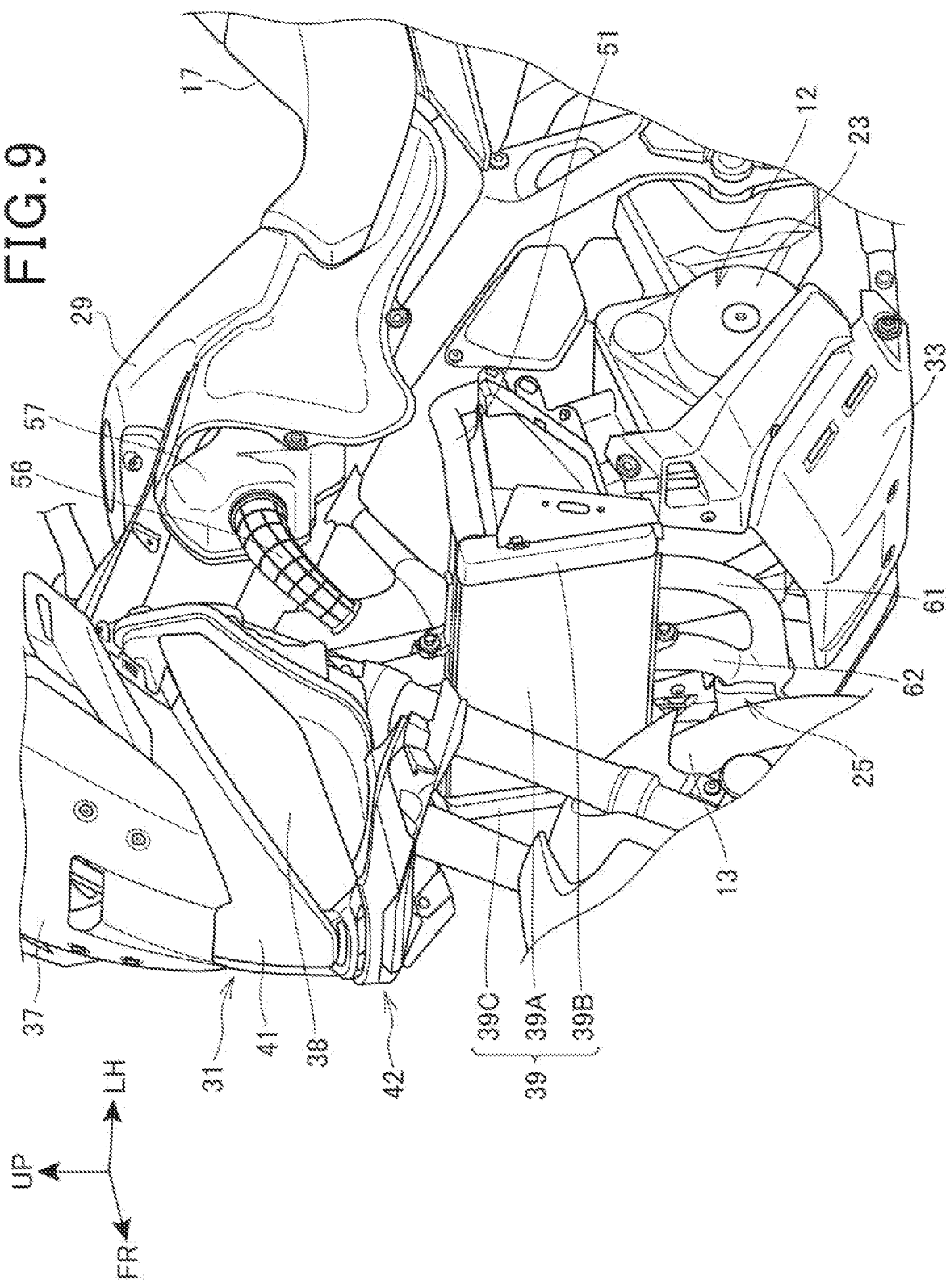
FIG. 9 is a diagram in which illustration of an inner cover is omitted from FIG. 8.

FIG. 8 is a diagram in which illustration of the connection covers 46 and the side covers 32 is omitted from FIG. 4. FIG. 9 is a diagram in which illustration of the inner cover 45 is omitted from FIG. 8.

The inner cover 45 is disposed behind the headlights 38. The inner cover 45 surrounds the front fork 14. The inner cover 45 includes a cover main body portion 45A disposed on the front upper side of the front fork 14, a U-shaped opening forming portion 45B provided below the cover main body portion 45A, cover side portions 45C serving as side portions formed on both left and right sides of the cover main body portion 45A, and blocking portions 45D provided at outer ends of the cover side portions 45C in the vehicle width direction.

The opening forming portion 45B is engaged with the front end inner 47 of the front front-end cowl 42 on the front end side. Both ends of the opening forming portion 45B in the vehicle width direction have strip shapes extending on the lower side. The cover side portions 45C cover the front fork 14 from the outer sides in the vehicle width direction. The cover side portions 45C are inclined on the outer sides in the vehicle width direction toward the rear side when seen from the upper side as illustrated in FIG. 7. Recessed portions 45C1 recessed on the inner side in the vehicle width direction are provided at the cover side portions 45C to correspond to the positions of left and right tanks 39B and 39C of the radiator 39. The left and right cover side portions 45C pass further inward than the tanks 39B and 39C in the vehicle width direction and extend on the rear side. As illustrated in FIG. 8, the cover side portions 45C and the opening forming portion 45B form a radiator disposition portion 45E with a shape cut into an L shape. The radiator 39 is disposed in the radiator disposition portion 45E.

The blocking portions 45D extend in the vehicle width direction toward the front side cowls 43 on the outer sides in the vehicle width direction (see FIG. 7).

As illustrated in FIGS. 4 and 7, the connection covers 46 are provided on both left and right sides of the inner cover 45. The connection covers 46 extend from the front front-end cowl 42 and are connected to the side covers 32. A hose cover portion 46A is provided at a rear end portion of the connection cover 46 on the left side. The hose cover portion 46A covers a connecting portion between the radiator 39 and a radiator hose 51 from the outer side in the vehicle width direction.

The connection covers 46 include sectioning portions 46B with plate shapes having thicknesses in the up-down direction as illustrated in FIG. 7. The sectioning portions 46B extend between the inner cover 45 and the front side cowls 43 and section a part of the wind guide path 54 on the upper and lower sides. Openings 46B1 penetrating through the sectioning portions 46B in the thickness direction are formed at rear portions of the sectioning portions 46B. The openings 46B1 overlap the tanks 39B and 39C. Duct forming portions 46C extending on the upper side are formed in front of the openings 46B1 (see FIG. 4). The duct forming portions 46C are curved to project on the outer sides in the vehicle width direction and extend on the outer sides in the vehicle width direction from the front side toward the rear side. The duct forming portions 46C are disposed to face the recessed portions 45C1 of the inner cover 45. The duct forming portions 46C form substantially tubular duct portions 49 along with the recessed portions 45C1.

Intake ducts 56 (see FIG. 4) extend from the upper side inside the duct portions 49. The intake ducts 56 extend from an air cleaner box 57 (see FIG. 4) disposed in front of the fuel tank 29. A pair of left and right intake ducts 56 are disposed. The intake ducts 56 have distal ends opening inside the duct portions 49.

The intake ducts 56 and the air cleaner box 57 on the outer side in the vehicle width direction are covered with the front side cowls 43 (see FIG. 3). The front side cowls 43 form the wind guide path 54 (see FIG. 7) between the front side cowl 43 itself and the inner cover 45.

Running wind flows into the front cowl 31 from the intake openings 47B1 of the front front-end cowl 42. In the wind guide path 54 of the front cowl 31, the running wind moves from the lower side of the connection covers 46 to the duct portions 49 (see FIG. 4) above the sectioning portions 46B through the openings 46B1 and is taken into the intake ducts 56 (see FIG. 4).

As illustrated in FIGS. 3 and 4, the front side cowls 43 are supported by the connection covers 46 and the side covers 32. The front side cowls 43 are connected to upper portions of cover wind exhaust portions 32G. The front side cowl 43 on the left side also covers the radiator hose 51 (see FIG. 8) on the left side from the outer side.

The front lower cowls 44 are connected to the front front-end cowl 42, the inner cover 45, and the connection covers 46. The front lower cowls 44 extend on the outer sides in the vehicle width direction from the front front-end cowl 42. The front lower cowls 44 extend along front edges of the front side cowls 43, are bent on the lower side in a bent shape, and are then connected to front ends of the cover wind exhaust portions 32G.

Figure 10:
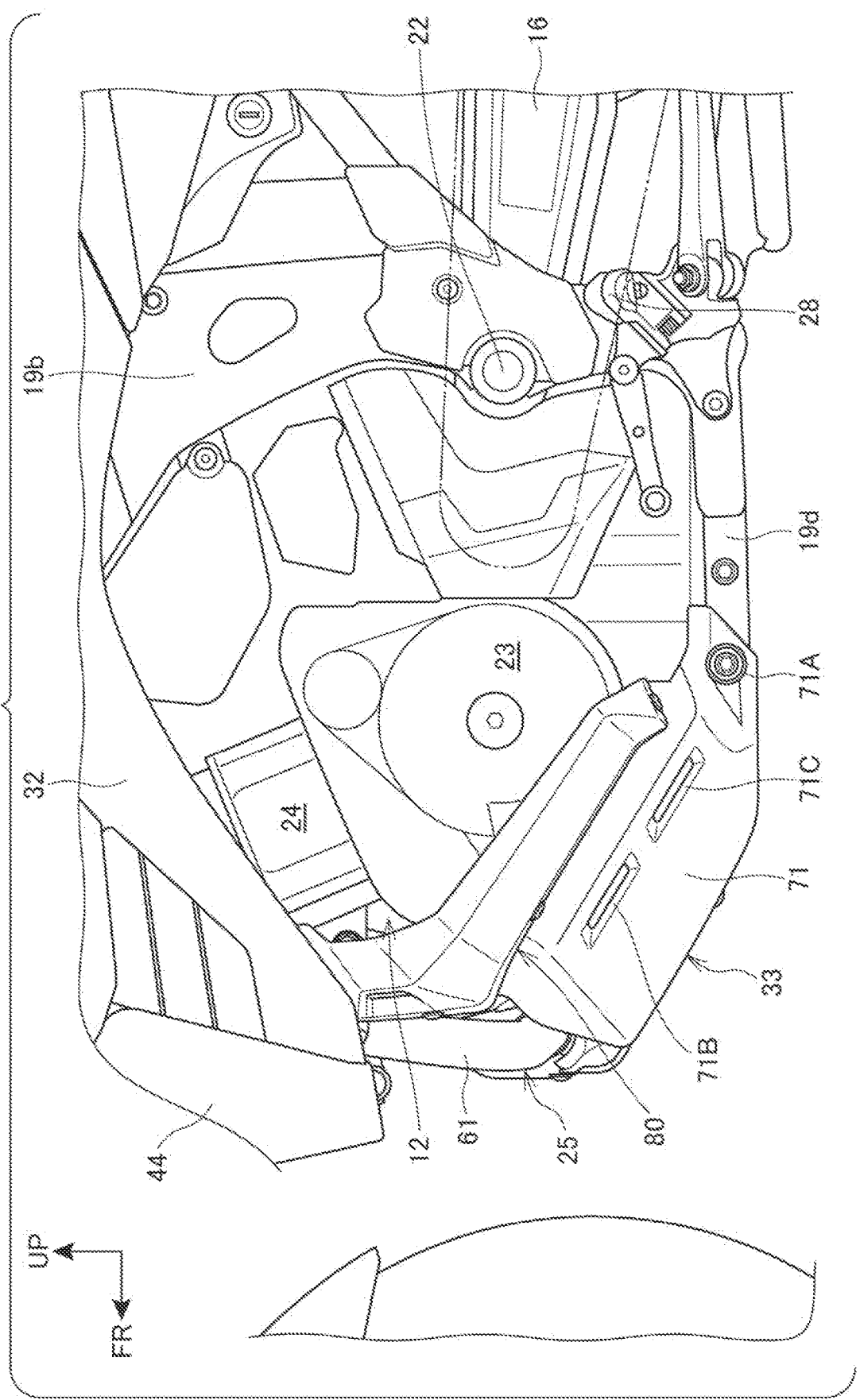
FIG. 10 is an enlarged view of main portions in FIG. 1 illustrating a peripheral portion of a crankcase of an engine.
Figure 11:
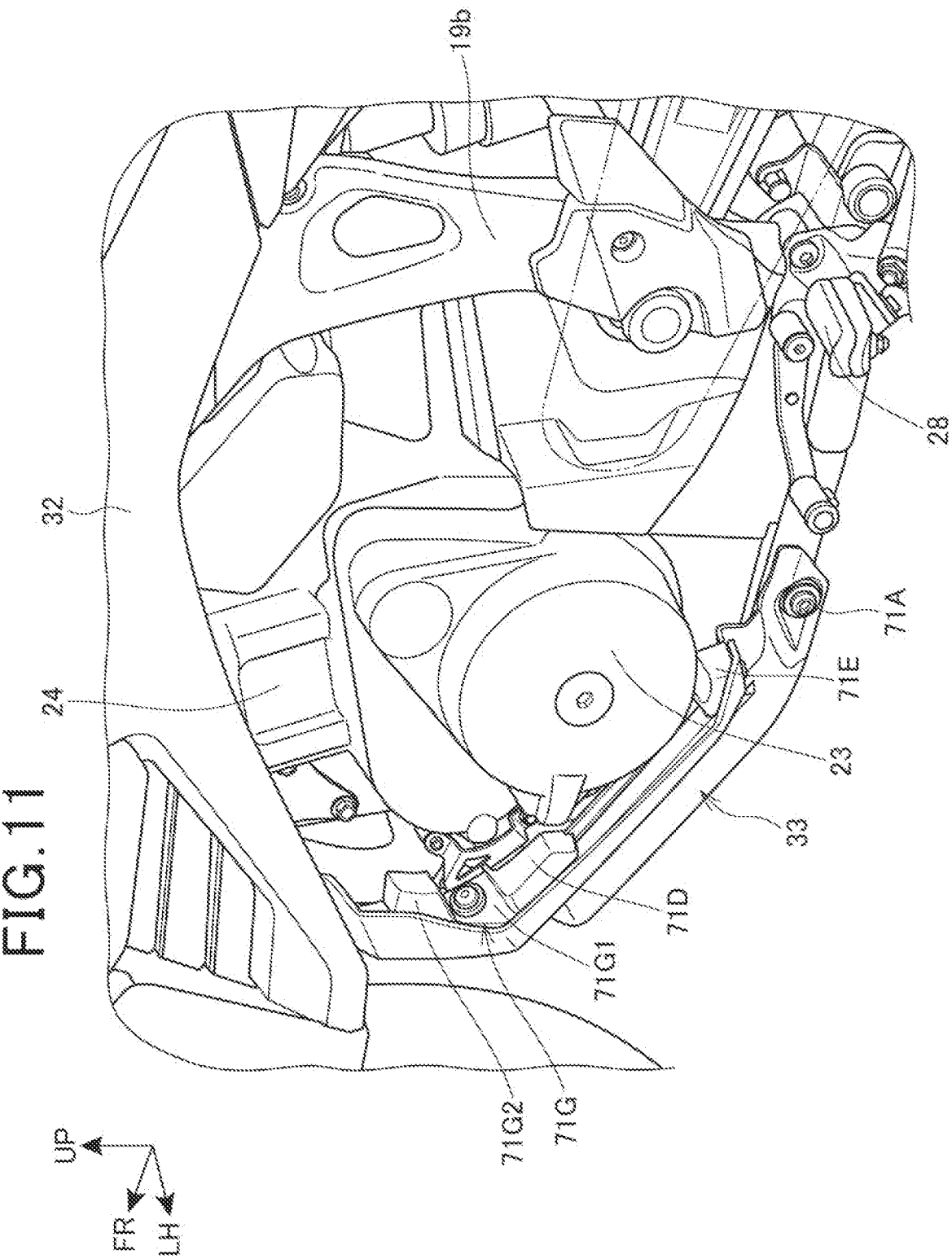
FIG. 11 is a perspective view of the saddle-ride vehicle when seen from a left lower side, which illustrates the peripheral portion of the crankcase of the engine.

FIG. 10 is an enlarged view of main portions in FIG. 1, which illustrates a peripheral portion of the crankcase 23 of the engine 12. FIG. 11 is a perspective view of the saddle-ride vehicle 10 when seen from the left rear side, which illustrates the peripheral portion of the crankcase 23 of the engine 12.

The power unit 12 in the present embodiment is an engine. Hereinafter, the power unit 12 will be referred to as an engine 12. The engine 12 includes the crankcase 23 and the cylinder 24 extending on the right upper side from the crankcase 23. Left and right side surfaces of the crankcase 23 are not covered with the vehicle body cover 30 and are exposed in the vehicle width direction. An exhaust device 25 is connected to a front surface of the upper portion of the cylinder 24.

Figure 12:
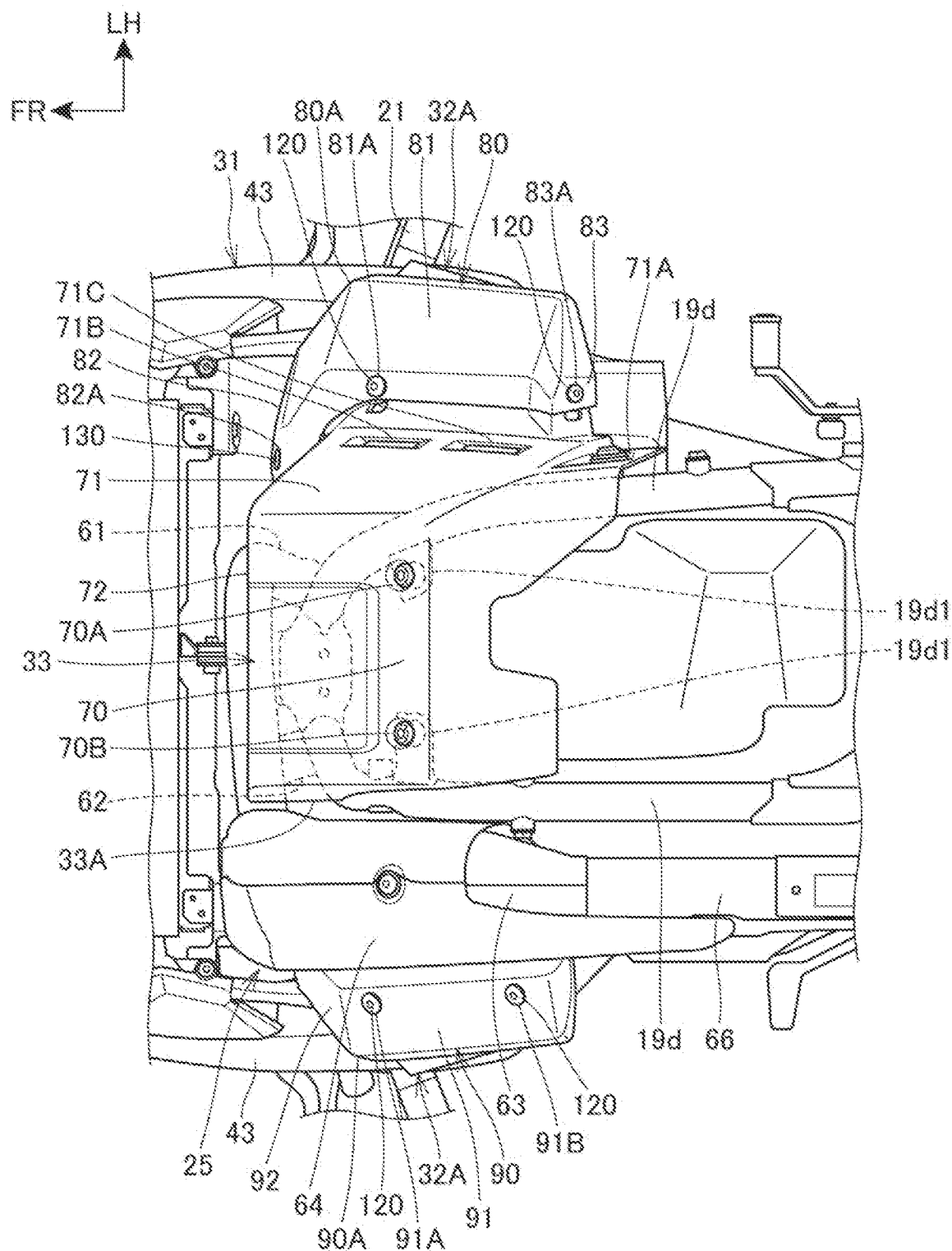
FIG. 12 is a bottom view of main portions of the saddle-ride vehicle according to the embodiment of the invention.
Figure 13:
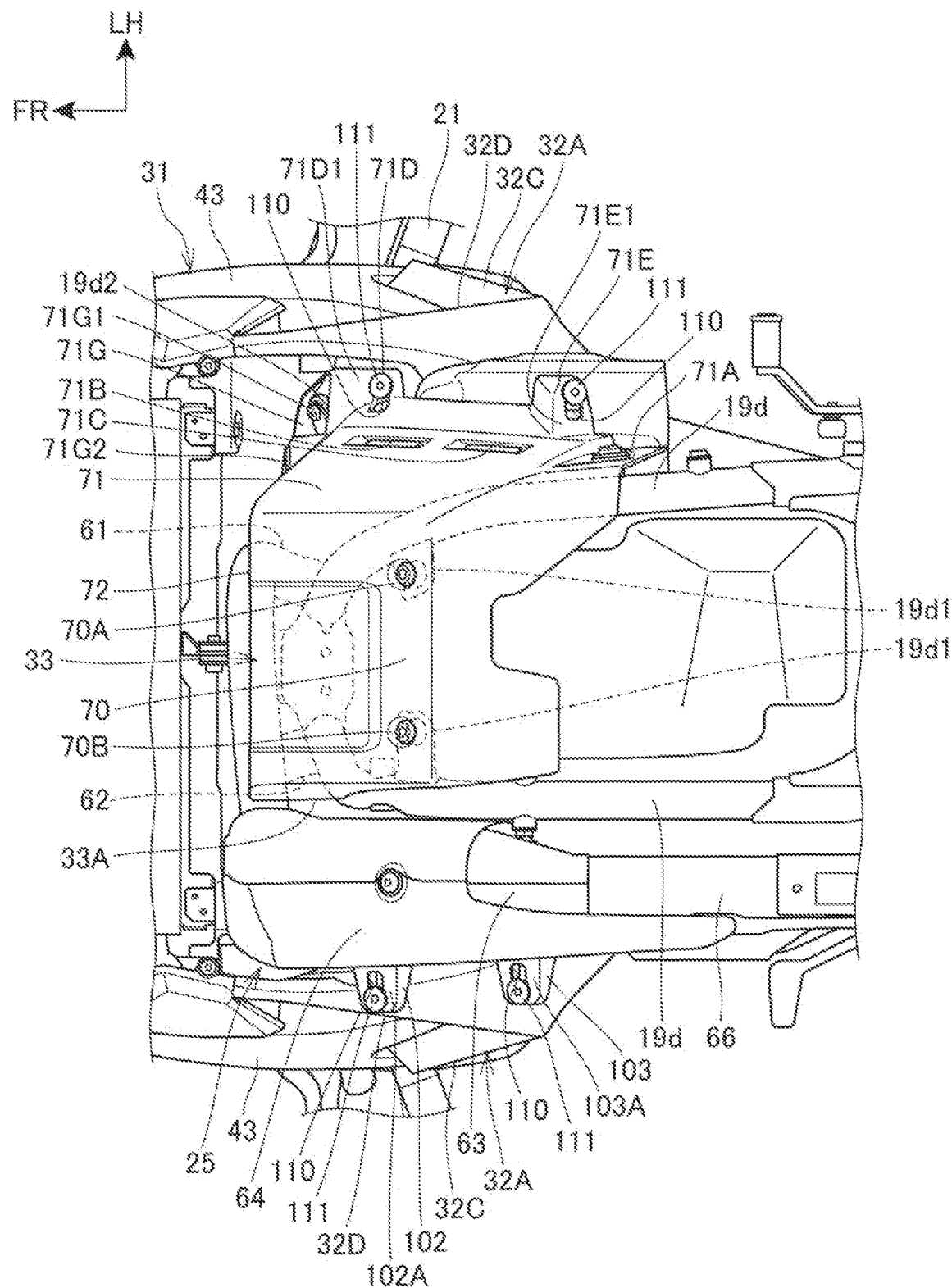
FIG. 13 is a diagram in which illustration of foot deflectors is omitted from FIG. 12.

FIG. 12 is a bottom view of main portions of the saddle-ride vehicle 10 according to the embodiment of the invention. FIG. 13 is a diagram in which illustration of the foot deflectors 80 and 90 is omitted from FIG. 12.

The exhaust device 25 includes a pair of left and right exhaust pipes 61 and 62. The exhaust pipe 61 on the left side extends on the lower side from the cylinder 24, is bent on the right side, and is then connected to a front end of a tubular catalyzer 63 extending in the front-rear direction. The exhaust pipe 62 on the right side extends on the lower side from the cylinder 24, is bent on the right side, and is then connected to the front end of the catalyzer 63 similarly to the exhaust pipe 61 on the left side. The catalyzer 63 extends in the front-rear direction. The catalyzer 63 is covered with a catalyzer cover 64. A second exhaust pipe 66 is connected to a rear end of the catalyzer 63. The second exhaust pipe 66 extends on the rear side and is connected to a muffler 67 (see FIG. 2).

As illustrated in FIG. 13, the undercover 33 is disposed on the left side of the catalyzer 63. The undercover 33 has a substantially flat dish shape in a bottom view. The undercover 33 includes a bottom wall 70 extending downward on the rear side, a left wall 71 extending on the left upper side from the left end of the bottom wall 70, and a front wall 72 (see FIG. 2) provided at the front ends of the bottom wall 70 and the left wall 71.

The undercover 33 extends along the lower frame 19d on the left side and covers the lower frame 19d on the left side from the left lower side. A right end 33A of the undercover 33 is set at the position of the lower frame 19d on the right side, and the undercover 33 covers only the front end portion of the lower frame 19d on the right side. The front wall 72 overlaps the exhaust pipes 61 in the bottom view.

The undercover 33 is fastened to stays 19d1 of the left and right lower frames 19d with fastening portions 70A and 70B of the bottom wall 70. Also, the undercover 33 is fastened to the lower frame 19d on the left side with a fastening portion 71A at the rear end portion of the left wall 71. Moreover, the undercover 33 is fastened to a stay 19d2 (see FIG. 13) extending from the lower frame 19d at a fastening portion 71G1 (see FIG. 13) on the left front side. In this manner, the undercover 33 is secured to the vehicle body frame 11 with the exhaust pipes 61 and 62 avoided.

As illustrated in FIG. 10, the left wall 71 of the undercover 33 has an oblong shape with an appearance extending downward on the rear side in a side view. The left wall 71 extends along the lower frame 19d on the left side. Slit holes 71B and 71C extending in the longitudinal direction of the left wall 71 are formed in the left wall 71.

As illustrated in FIG. 13, a pair of front and rear stays 71D and 71E are formed at the upper end of the left wall 71. The stays 71D and 71E have square-cylindrical shapes projecting on the outer sides in the vehicle width direction. Attachment/detachment holes 110 penetrating in the thickness direction are formed in fastening surfaces 71D1 and 71E1 below the stays 71D and 71E. The fastening surface 71E1 of the stay 71E on the rear side is directed to the rear side relative to the fastening surface 71D1 of the stay 71D on the front side, and the penetrating direction of the attachment/detachment hole 110 in the stay 71E on the rear side is slightly inclined in the front-rear direction. Bolts 120 are inserted into the attachment/detachment holes 110. The foot deflector 80 on the left side is supported by the stays 71D and 71E with the bolts 120.

An extending portion 71G extending on the front upper side from the stay 71D is formed in front of the stay 71D on the front side. The fastening portion 71G1 secured to the lower frame 19d on the left side is formed at a rear portion of the extending portion 71G. A securing portion 71G2 to which the foot deflector (the windshield on one side in the vehicle width direction) 80 on the left side is secured is formed at a front end of the extending portion 71G.

In FIGS. 11 and 12, the foot deflector 80 on the left side extends downward on the rear side in a side view similarly to the left wall 71 of the undercover 33. The foot deflector 80 has a shape extending downward on the rear side from the front side of the cylinder 24 and extending on the rear side up to the height of the step 28 in a side view. As illustrated in FIG. 12, the foot deflector 80 has substantially an L shape extending to about an outer end of the front side cowl 43 and bent on the inner side in the vehicle width direction from the projecting end 80A in a bottom view.

In FIGS. 11 and 12, the foot deflector 80 includes an outer side surface portion 81 extending along the front-back direction, a front surface portion 82 bent on the right side from the front end of the outer side surface portion 81, and a rear surface portion 83 bent on the inner side in the vehicle width direction from the rear end of the outer side surface portion 81.

The foot deflector 80 is disposed to cover the extending portion 71G of the undercover 33 and the stays 71D and 71E from the lower side.

The foot deflector 80 is secured to the securing portion 71G2 of the undercover 33 at the securing portion 82A of the front surface portion 82. The securing portion 82A is secured to the securing portion 71G2 with a bolt 130 extending in the front-back direction. Also, the foot deflector 80 is detachably supported by the stay 71D on the front side at a support portion 81A of the outer side surface portion 81. Further, the foot deflector 80 is detachably supported by the stay 71E on the rear side at a support portion 83A of the rear surface portion 83. The support portions 81A and 83A are supported by the stays 71D and 73E with the bolts 120 extending in the up-down direction.

The foot deflector 80 is firmly supported by the undercover 33 at the front surface portion 82. Also, the foot deflector 80 is detachably supported by the undercover 33 at the outer side surface portion 81 and the rear surface portion 83. In this manner, portions other than the front surface portion 92 are easily detached from the undercover 33 in a case in which the foot deflector 90 receives an external force. Therefore, even if the foot deflector 80 receives a force from the outside of the vehicle body, the force can be easily released.

An opening 82B (see FIG. 2) penetrating in the front-rear direction is formed at the front surface portion 82 of the foot deflector 80. The opening 82B is formed further outward in the vehicle width direction than the securing portion 82A. A cover engagement portion 82C (see FIG. 20) engaged with the side cover 32 is formed at the upper end of the front surface portion 82. The foot deflector 80 on the left side is supported by the vehicle body frame 11 via the undercover 33 and is engaged with and supported by the side cover 32.

Figure 14:
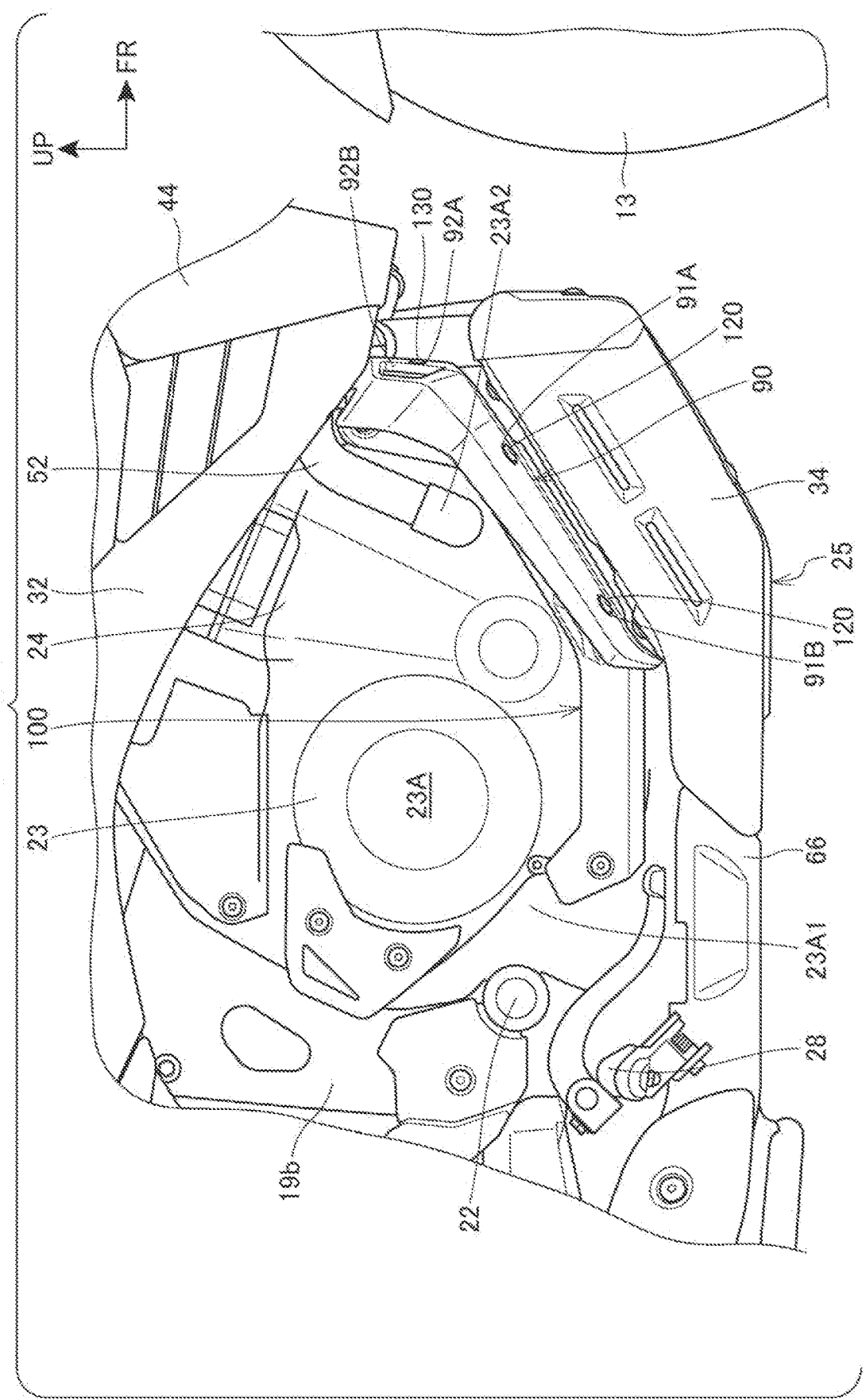
FIG. 14 is a right side view of the saddle-ride vehicle illustrating the peripheral portion of the crankcase.
Figure 15:
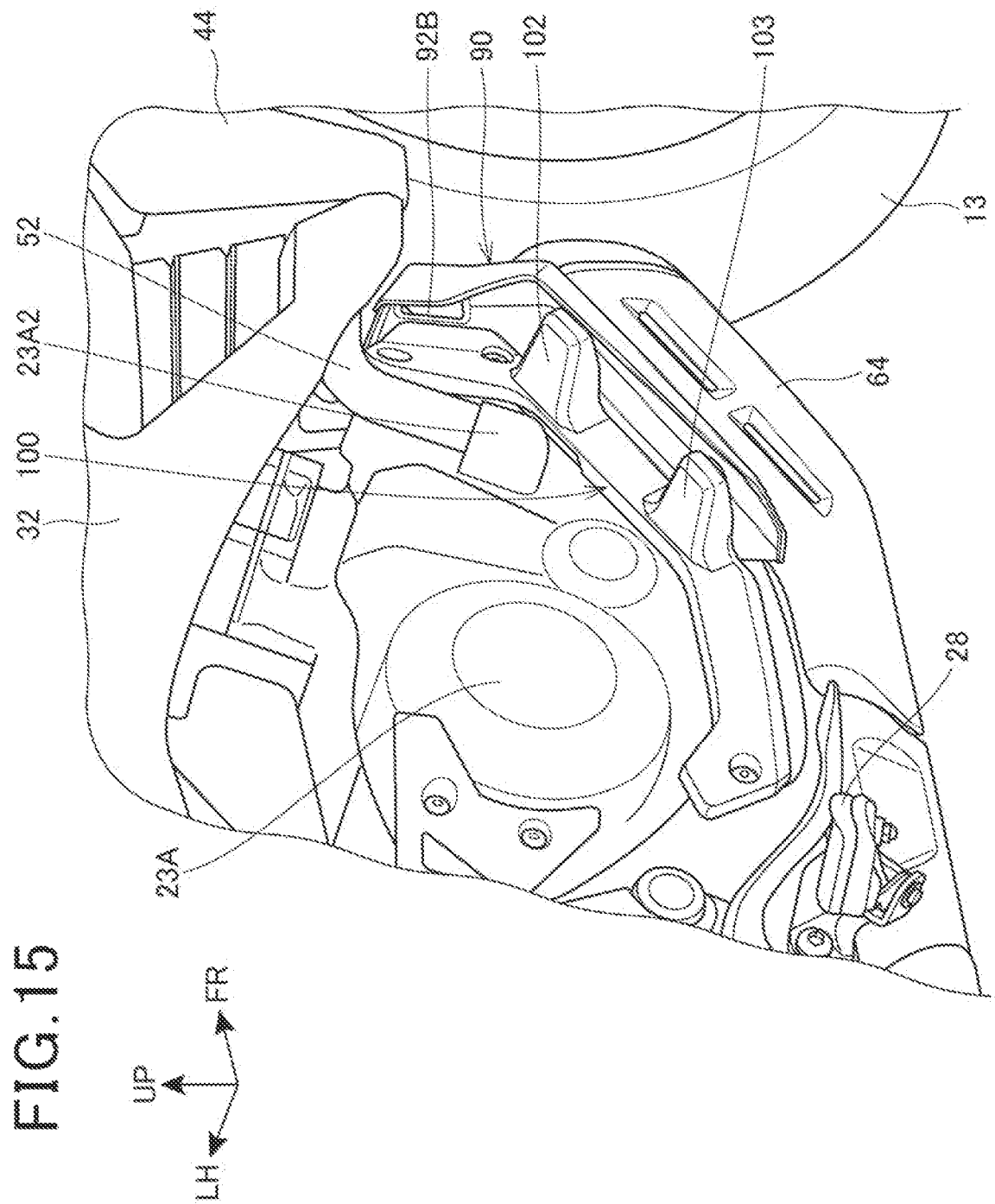
FIG. 15 is a perspective view of the saddle-ride vehicle when seen from a right rear side, which illustrates the peripheral portion of the crankcase.
Figure 16:
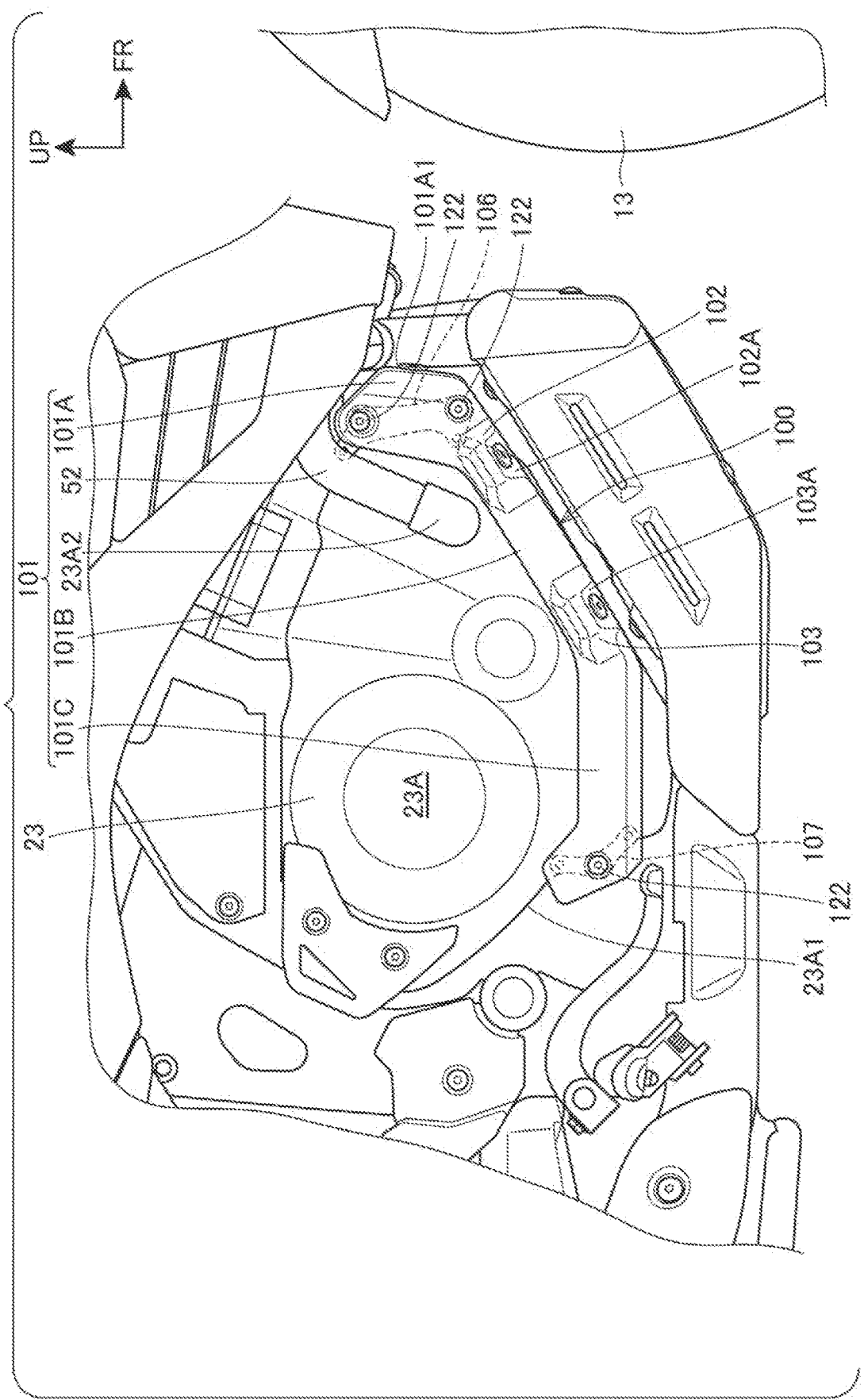
FIG. 16 is a diagram in which illustration of the foot deflector on the right side is omitted from FIG. 14.

FIG. 14 is a right side view of the saddle-ride vehicle 10 illustrating the peripheral portion of the crankcase 23. FIG. 15 is a perspective view of the saddle-ride vehicle 10 when seen from the right rear side, which illustrates the peripheral portion of the crankcase 23. FIG. 16 is a diagram in which illustration of the foot deflector 90 on the right side is omitted from FIG. 14.

The foot deflector 90 (the windshield on the other side in the vehicle width direction) on the right side is disposed on the right lower side of the engine 12. The foot deflector 90 on the right side is formed to be substantially horizontally symmetrical with respect to the foot deflector 80 on the left side.

The foot deflector 90 on the right side extends downward on the rear side in a side view. The foot deflector 90 has a shape extending downward on the rear side from the front side of the cylinder 24 and extending on the rear side up to the height of the step 28 in a side view. Also, the foot deflector 90 has substantially an L shape projecting up to the outer end of the front side cowl 43 and bent on the inner side in the vehicle width direction from the projecting end 90A in a bottom view illustrated in FIG. 12.

The foot deflector 90 on the right side includes an outer side surface portion 91 extending along the front-rear direction and a front surface portion 92 bent on the left side from the front end of the outer side surface portion 91.

The foot deflector 90 on the right side is supported by the engine 12. In the present embodiment, the foot deflector 90 on the right side is supported by the engine 12 via the windshield stay 100 (see FIG. 16 and the like). In other words, the foot deflector 80 on the left side is configured to be supported by the vehicle body frame 11 while the foot deflector 90 on the right side is supported by the engine 12 instead of the vehicle body frame 11.

As illustrated in FIG. 16, the windshield stay 100 is supported only by the crankcase 23 of the engine 12. Specifically, the windshield stay 100 is supported by a crankcase cover (side surface) 23A on the right side included in the crankcase 23.

The windshield stay 100 includes a secured portion 101 extending along an outer peripheral edge 23A1 on the lower side of the crankcase cover 23A. The secured portion 101 includes a front portion 101A disposed forward than a connecting portion 23A2 between the crankcase cover 23A and the radiator hose 52, an intermediate portion 101B extending downward on the rear side beyond the connecting portion 23A2 from the front portion 101A, and a rear portion 101C extending on the rear side from the rear end of the intermediate portion 101B.

The front portion 101A is secured to a bracket 106 secured to the crankcase cover 23A. Also, the rear portion 101C is secured to a bracket 107 secured to the crankcase 23. The brackets 106 and 107 are secured only to the crankcase cover 23A and are secured only to the engine 12. The windshield stay 100 is secured to the brackets 106 and 107 with bolts 122 (see FIG. 16) extending in the vehicle width direction.

A securing portion 101A1 to which the foot deflector 90 is secured is formed in the front surface of the front portion 101A.

Stays 102 and 103 extending on the outer side in the vehicle width direction are formed at the intermediate portion 101B. The stays 102 and 103 have hollow square-cylindrical shapes. Fastening surfaces 102A and 103A on the lower side of the stays 102 and 103 face the front lower side. Attachment/detachment holes 110 are formed in the fastening surfaces 102A and 103A of the stays 102 and 103.

The foot deflector 90 on the right side is disposed to cover the front portion 101A and the stays 102 and 103 of the windshield stay 100 from the front lower side.

The foot deflector 90 is secured to the secured portion 101 of the windshield stay 100 at the securing portion 92A of the front surface portion 92. The securing portion 92A is secured to the secured portion 101 with a bolt 130 extending in the front-rear direction. Also, the foot deflector 90 is detachably supported by the stay 102 on the front side at the support portion 91A of the outer side surface portion 91. Moreover, the foot deflector 90 is detachably supported by the stay 103 on the rear side at the support portion 91B of the outer side surface portion 91. The support portions 91A and 91B are supported by the stays 102 and 103 with the bolts 120 extending in the up-down direction.

The foot deflector 90 is firmly supported by the windshield stay 100 at the front surface portion 92. Also, the foot deflector 90 is detachably supported by the windshield stay 100 at the outer side surface portion 91. In this manner, in a case in which the foot deflector 90 receives an external force, portions other than the front surface portion 92 are easily detached from the windshield stay 100. Therefore, even if the foot deflector 90 receives a force from the outer side of the vehicle body, the force can be easily released.

An opening 92B (see FIG. 2) penetrating in the front-rear direction is formed in the front surface portion 92 of the foot deflector 90. The opening 92B is formed further outward in the vehicle width direction than the securing portion 92A. The radiator hose 52 extends above the front surface portion 92 (see FIG. 15). The foot deflector 90 on the right side is not engaged with the side cover 32 on the right side.

Therefore, the foot deflector 90 on the right side is supported only by the engine 12 unlike the foot deflector 80 on the left side.

Figure 17:
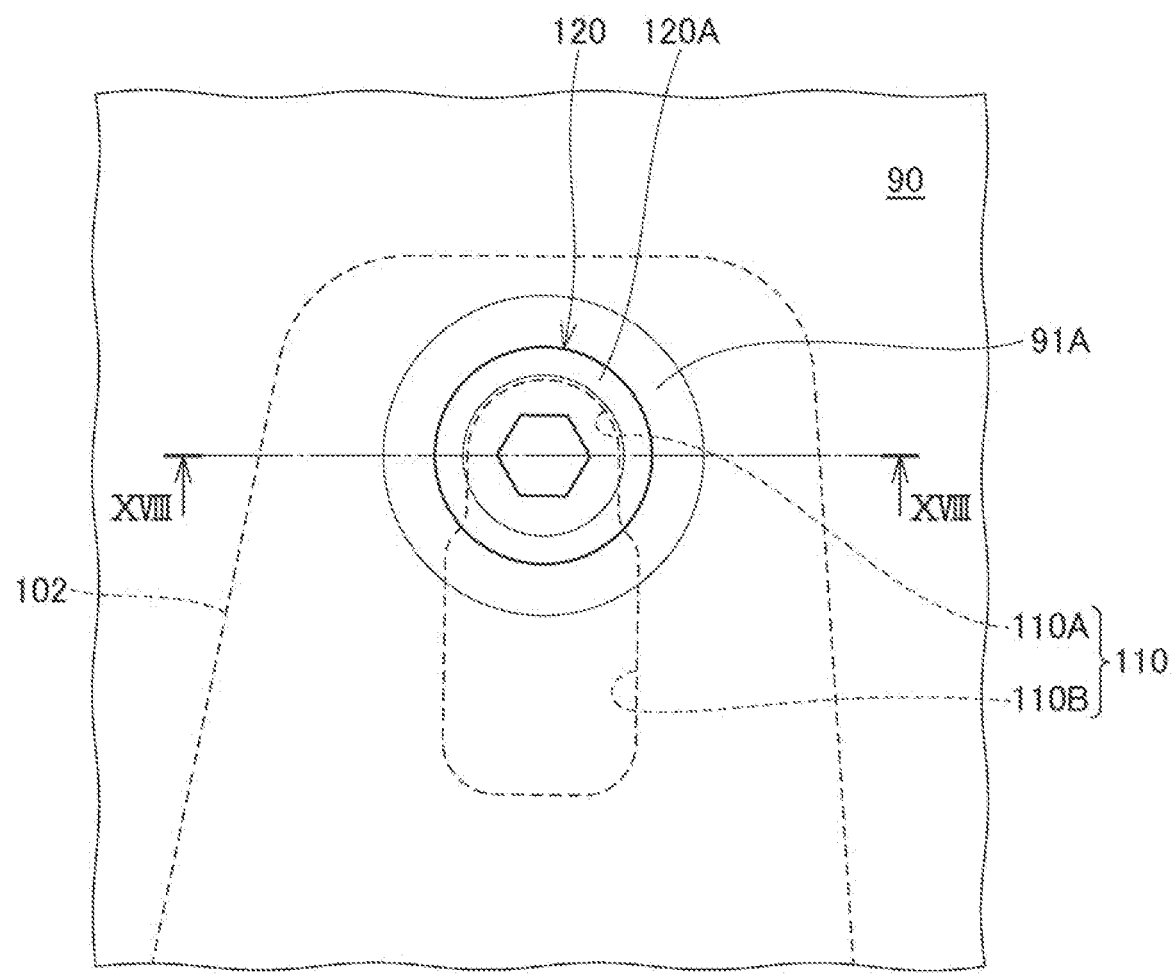
FIG. 17 is an enlarged view of a fastening portion between the foot deflector on the right side and a stay of a windshield stay.
Figure 18:
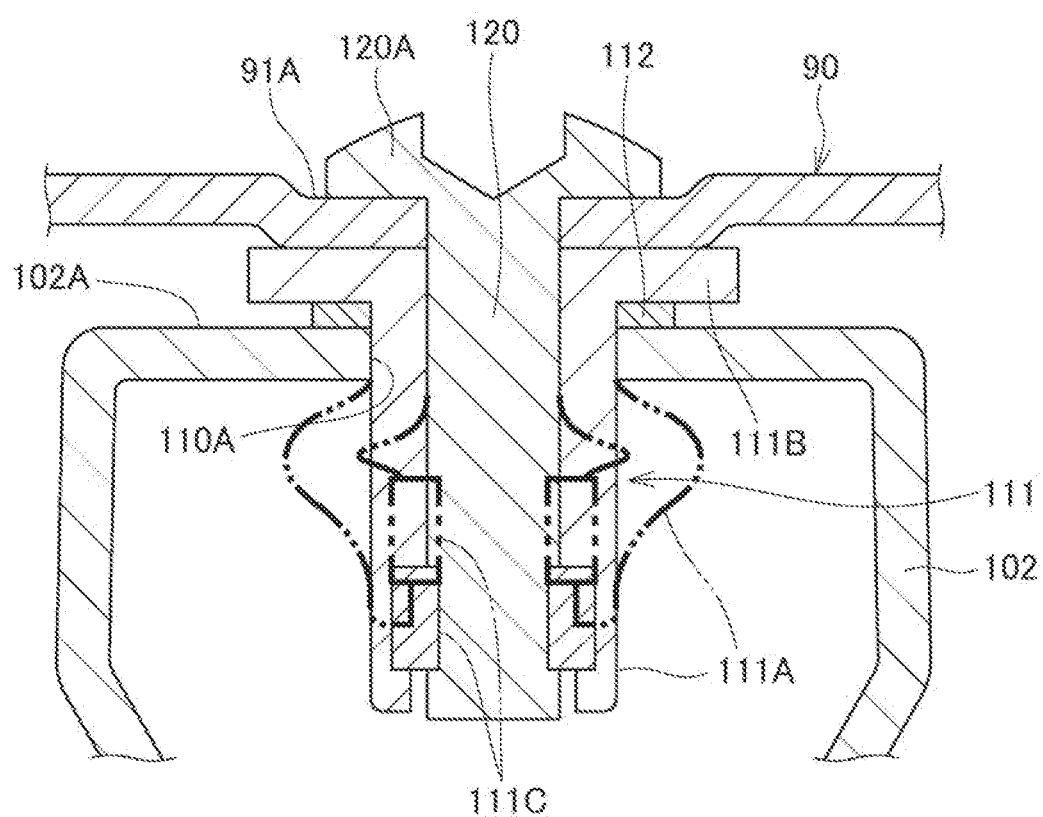
FIG. 18 is a schematic view corresponding to a section along the line XVIII-XVIII in FIG. 17.

FIG. 17 is an enlarged view of the fastening portion between the foot deflector 90 on the right side and the stay 102 of the windshield stay 100. FIG. 18 is a schematic view corresponding to the section along the line XVIII-XVIII in FIG. 17.

Attachment/detachment holes 110 with opening shapes are formed in the fastening surface 102A of the stay 102. As the attachment/detachment holes 110, an attachment hole 110A and a separation hole 110B with an opening that is continuously formed from the attachment hole 110A are formed.

In the present embodiment, the attachment hole 110A has a circular shape while the separation hole 110B has a quadrangular hole shape. The opening width of the separation hole 110B is wider than the opening width of the attachment hole 110A. The separation hole 110B is formed further inward in the vehicle width direction than the attachment hole 110A.

A well nut 111 is disposed in the attachment hole 110A. The well nut 111 is a member in which a nut is integrated with a rubber tube. Specifically, the well nut 111 includes a tubular portion 111A extending in a predetermined axial direction. A flange portion 111B is formed at one end of the tubular portion 111A in the axial direction. Also, a nut 111C is supported inside the tubular portion 111A on the other end side in the axial direction.

In the present embodiment, washer 112 is sandwiched between the flange portion 111B of the well nut 111 and the fastening surface 102A of the stay 102. The bolt (shaft member) 120 is inserted into the hole of the support portion 91A of the foot deflector 90, and the bolt 120 is inserted into the hole of the tubular portion 111A of the well nut 111 attached to the stay 102. If the bolt 120 is fastened, then the nut 111C is attracted to a head portion 120A of the bolt 120 and becomes a tubular portion (large diameter part) 111A with a diameter increasing due to the tubular portion 111A crushed in the axial direction in accordance with rotation of the bolt 120. Therefore, the flange portion 111B and the tubular portion 111A with the increasing diameter pinch the fastening surface 102A of the stay 102. Also, the head portion 120A of the bolt 120 and the tubular portion 111A with the increasing diameter pinch the foot deflector 90 and the stay 102. In this manner, the foot deflector 90 is detachably supported by the stay 102. It is desirable that the tubular portion (large diameter part) 111A with the increasing diameter have a smaller diameter than the opening width of the separation hole 110B.

Similarly, the well nut 111, the washer 112, and the bolt 120 are used for the attachment/detachment holes 110 for the stay 103 of the windshield stay 100 and the stays 71D and 71E of the undercover 33, and the foot deflectors 80 and 90 are thereby detachably supported.

Although running wind flows when the saddle-ride vehicle 10 runs, the running wind is easily dispersed to the outer side in the vehicle width direction by the foot deflectors 80 and 90, and the feet of the rider are easily protected from the running wind in the present embodiment.

Also, the feet of the rider can be protected by the foot deflectors 80 and 90 even if sand and the like splashed from the ground or the like are about to be directed to the feet of the rider when the saddle-ride vehicle 10 runs.

Therefore, it is possible to easily mount the foot deflector 90 and to effectively reduce exposure of the rider to wind even in the saddle-ride vehicle 10 with no vehicle body cover 30 covering a side of the crankcase 23 of the engine 12 as in the present embodiment.

Here, the foot deflectors 80 and 90 may receive a force from the outside of the vehicle body. At this time, the bolt 120 and the well nut 111 can move from the attachment hole 110A to the separation hole 110B on the inner side of the vehicle body due to the orientation of the bolt 120, the shape of the attachment/detachment hole 110, and the like through elastic deformation of the well nut 111 or the like in the attachment/detachment hole 110. Also, if the bolt 120 and the well nut 111 move to the separation hole 110B, then the well nut 111 is easily separated from the separation hole 110B. Therefore, even if the foot deflectors 80 and 90 receive a force from the outside of the vehicle body, the force can be easily released.

Since the washer 112 is disposed in the present embodiment, in particular, the flange portion 111B made of rubber is unlikely to come into direct contact with the fastening surfaces 71E1, 71F1, 102A, and 103A of the stays 71E, 71F, 102, and 103, a sliding resistance is thus reduced, and the bolt 120 and the well nut 111 can be easily moved in an appropriate manner in a case in which a force acts thereon. Note that although the washer 112 is provided in the present embodiment, the foot deflectors 80 and 90 may be supported without providing the washer 112.

Note that the foot deflectors 80 and 90 are secured at the front surface portions 82 and 92 and the foot deflectors 80 and 90 can be reliably held by the vehicle body even if the foot deflectors 80 and 90 are separated from the outer side surface portions 81 and 91.

Figure 19:
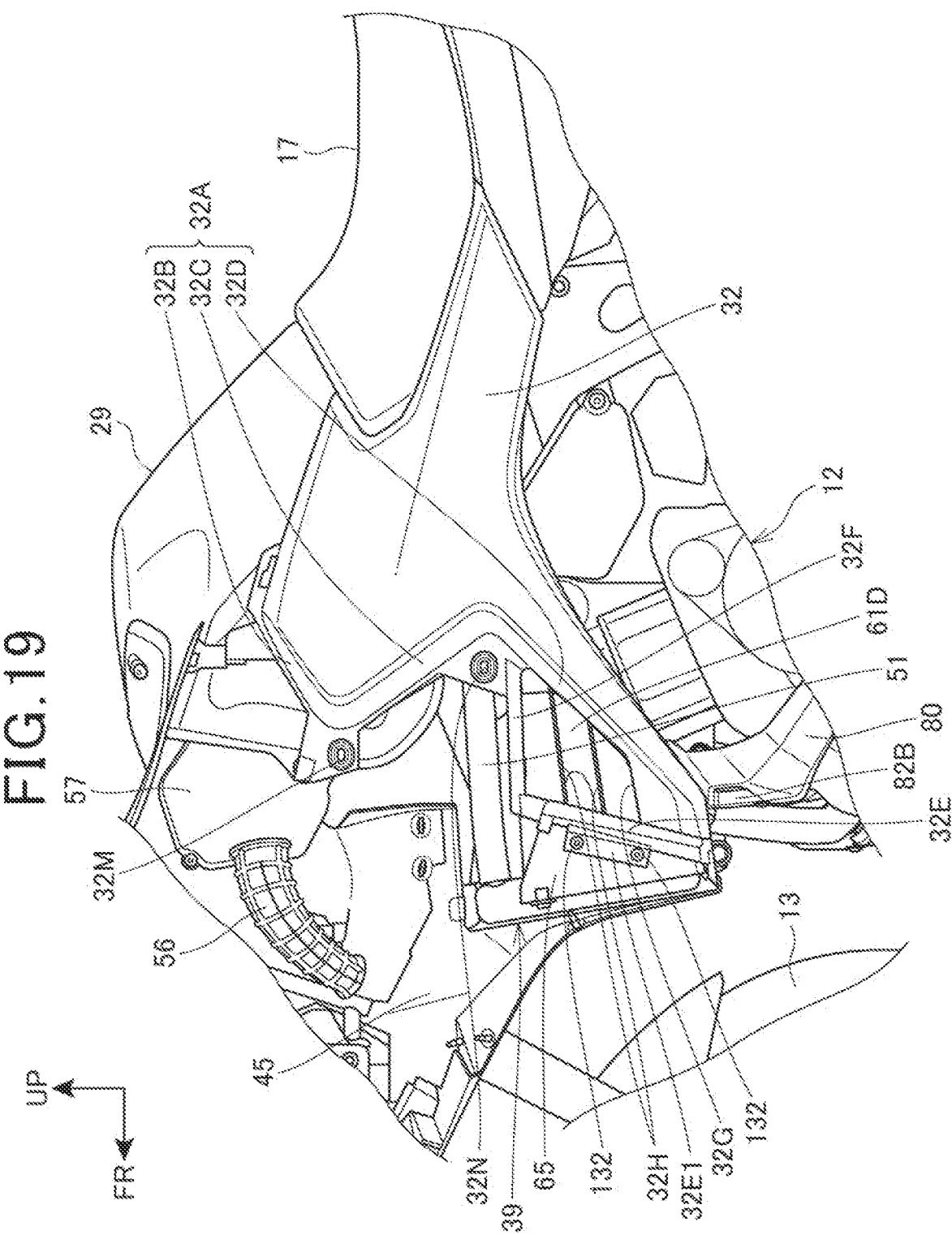
FIG. 19 is a left side view of the saddle-ride vehicle in a case in which the connection cover is omitted from FIG. 4.
Figure 20:
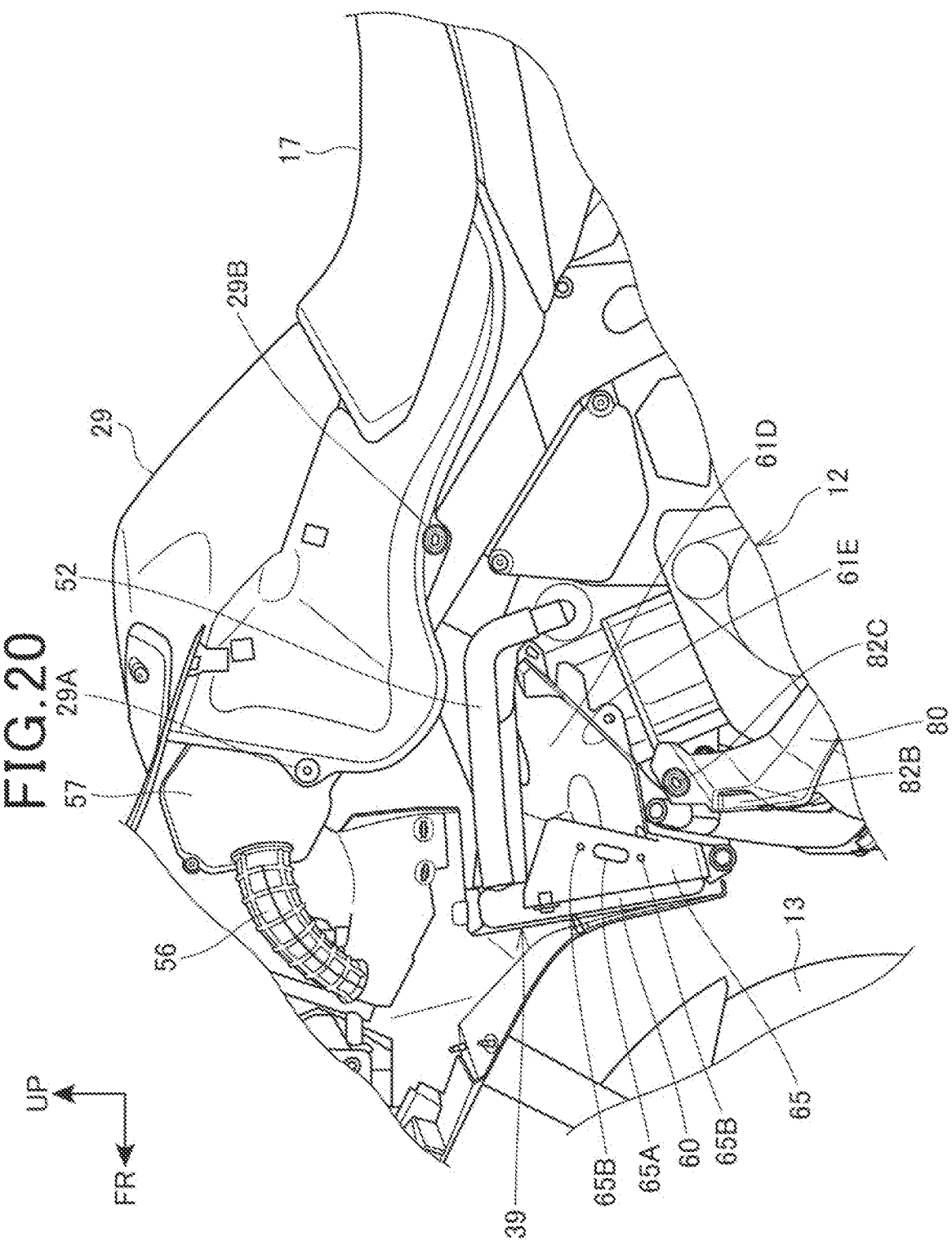
FIG. 20 is a diagram in which illustration of the side cover is omitted from FIG. 19.

FIG. 19 is a left side view of the saddle-ride vehicle 10 in a case in which the connection cover 46 is omitted from FIG. 4. FIG. 20 is a diagram in which illustration of the side covers 32 is omitted from FIG. 19.

The radiator 39 is formed into a rectangular plate shape extending in the vehicle width direction. The radiator 39 is disposed in front of the down frame 19c (see FIG. 1). The radiator 39 is located between the side cover 32 on the left side and the side cover 32 on the right side. The radiator 39 includes a rectangular core 39A extending in the vehicle width direction, a tank 39B on the left side provided on the left side of the core 39A, and a tank 39C on the right side provided on the right side of the core 39A.

Cooling water is pressure-fed by a water pump (not illustrated) provided at the crankcase 23 and is circulated between the engine 12 and the radiator 39. The cooling water with a temperature raised after cooling the engine 12 flows into the tank 39B on the left side through the radiator hose 51 and is then cooled by running wind at the core 39A of the radiator 39. The cooling water cooled by the core 39A flows out of the tank 39C on the right side, is fed to the engine 12 through the radiator hose 52 (see FIG. 15), cools the engine 12, and is returned to the radiator 39, and this is repeated.

The radiator 39 in the present embodiment is supported by the down frame 19c (see FIG. 1) via a radiator shroud 60.

The radiator shroud 60 is a member located behind the core 39A of the radiator 39 and guiding wind discharged by the radiator 39.

The radiator shroud 60 includes a side wall portion 65 on the left side covering the left surface of the radiator 39 and a side wall portion (not illustrated) on the right side covering the right surface of the radiator 39.

The side wall portion 65 has a triangular plate shape with a width in the up-down direction narrowed toward the rear side in a side view. The side wall portion 65 covers the side surface of the radiator 39 from the outer side in the vehicle width direction. The side wall portion 65 is separated from the wind exhaust guide portion 61D on the inner side in the vehicle width direction, and wind discharged from a radiator fan (not illustrated) can pass between the side wall portion 65 and the wind exhaust guide portion 61D. The discharged wind is guided to the outer side in the vehicle width direction by the wind exhaust guide portion 61D and is discharged from a wind exhaust port 61E.

A cover engagement hole 65A penetrating in the thickness direction is formed at a rear portion of the side wall portion 65. The cover engagement hole 65A extends in the up-down direction. Cover securing holes 65B are formed on the upper and lower sides of the cover engagement hole 65A. The side cover 32 is engaged with the cover engagement hole 65A.

As illustrated in FIG. 19, the side cover 32 extends from the seat 17 toward the front side. The side cover 32 covers the fuel tank 29 and the lower side of the front portion of the seat 17 from the side.

A projecting portion 32A extending in a substantially S shape in a side view is formed at a front end portion of the side cover 32. The projecting portion 32A includes an upper portion 32B extending downward on the front side from the upper end, an intermediate portion 32C extending downward on the rear side from the lower end of the upper portion 32B, and an extending portion 32D extending downward on the front side from the lower end of the intermediate portion 32C. The lower end of the intermediate portion 32C extends up to the position of the radiator hose 51 in a side view. The extending portion 32D extends along the rear side of the radiator shroud 60 of the radiator 39.

A first connecting portion 32E extending on the upper side is formed at the front end of the extending portion 32D. The first connecting portion 32E includes an engagement portion 32E1 with a plate shape. An engagement portion main body (not illustrated) projecting on the inner side in the vehicle width direction is formed on the inner surface of the engagement portion 32E1 in the vehicle width direction. The engagement portion main body is engaged with the cover engagement hole 65A of the side wall portion 65 of the radiator shroud 60, and upper and lower portions of the engagement portion 32E1 are secured to the cover securing holes 65B of the radiator shroud 60 with securing tools 132.

The side cover 32 is also engaged with engagement portions 29A and 29B of the fuel tank 29. Also, the side cover 32 is also engaged with the cover engagement portion 82C provided at the upper end of the foot deflector 80 on the left side supported by the undercover 33.

The side cover 32 is supported by the vehicle body frame 11 via the radiator shroud 60, the foot deflector 80, the fuel tank 29, and the like.

A second connecting portion 32F connecting the upper end of the first connecting portion 32E and the upper end of the extending portion 32D is formed at the upper end of the first connecting portion 32E. The cover wind exhaust portion 32G is formed by an opening shape surrounded by the first connecting portion 32E, the second connecting portion 32F, and the extending portion 32D. A plurality of louver portions 32H extending in the front-rear direction are provided between the first connecting portion 32E and the extending portion 32D across the cover wind exhaust portion 32G.

The cover wind exhaust portion 32G overlaps the wind exhaust port 61E of the radiator 39 in a side view. The wind discharged from the wind exhaust port 61E of the radiator 39 is discharged to the outside of the vehicle body cover 30 through the cover wind exhaust portion 32G.

Engagement portions 32M and 32N are formed in the side cover 32. The front side cowl 43 (see FIG. 3) is engaged with engagement portions 32M and 32N.

The front side cowl 43 is connected to the side cover 32 along the upper portion 32B of the projecting portion 32A, the intermediate portion 32C, and the second connecting portion 32F as illustrated in FIG. 3.

Also, the front side cowl 43 is connected to the upper edge of the front lower cowl 44. The front lower cowl 44 covers the front side of the first connecting portion 32E of the side cover 32.

The vehicle body cover 30 has a shape surrounded by the front side cowls 43, the front lower cowls 44, and the extending portions 32D of the projecting portions 32A of the side covers 32 and forms an opening for the cover wind exhaust portion 32G.

Here, the projecting portions 32A have parts projecting in the vehicle width direction further than the front side cowls 43 as illustrated in FIGS. 2 and 12, and the projecting portions 32A overlap a handle 21 in a bottom view. Therefore, wind discharged from the cover wind exhaust portion 32G is easily guided by the projecting portions 32A.

As described above, according to the embodiment to which the invention is applied, the saddle-ride vehicle 10 in which the crankcase cover 23A of the engine 12 is exposed includes the foot deflector 90 located in front of a foot of a rider, and the foot deflector 90 is located at the crankcase cover 23A of the crankcase 23 of the engine 12 and is supported only by the crankcase 23. Therefore, it is possible to easily mount the foot deflector 90 and to effectively reduce exposure of the rider to wind even in the saddle-ride vehicle 10 with no vehicle body cover 30 covering a side of the engine 12.

In the present embodiment, the foot deflector 90 is supported via the windshield stay 100 provided at the crankcase cover 23A. Therefore, it is possible to easily mount the foot deflector 90 even in the saddle-ride vehicle 10 with no vehicle body cover 30.

In the present embodiment, a part of the outer side surface portion 91 of the foot deflector 90 is detachably supported by the windshield stay 100. Therefore, it is possible to separate the part of the foot deflector 90 and to easily release a force received by the foot deflector 90 in a case in which the foot deflector 90 receives an external force.

In the present embodiment, the windshield stay 100 is provided with the attachment/detachment holes 110 with an opening shape at which the foot deflector 90 is detachably supported via the bolt 120, the attachment/detachment holes 110 include the attachment hole 110A and the separation hole 110B forming an opening shape that is continuous with the attachment hole 110A and having a wider opening width than the attachment hole 110A, and the foot deflector 90 is supported by the well nut 111 being supported by the bolt 120 in a state in which the bolt 120 is inserted into the attachment hole 110A, the well nut 111 being able to pass through the separation hole 110B, the well nut 111 being larger than the attachment hole 110A. Therefore, the securing member to which the well nut 111 corresponds can pass through the separation hole 110B by the bolt 120 moving from the attachment hole 110A to the separation hole 110B, and it is possible to separate a part of the windshield in a case in which the foot deflector 90 receives an external force.

In the present embodiment, the securing member is the well nut 111. Therefore, it is possible to easily mount and assemble the securing member and to easily move the bolt 120 to the separation hole 110B in a case in which an external force acts on the foot deflector 90 since the well nut 111 as the securing member is elastically deformable.

Other Embodiments

The aforementioned embodiment illustrates only an aspect of the invention, and modifications and applications can arbitrarily be made without departing from the gist of the invention.

Although the configuration in which the foot deflector 80 supported by the vehicle body frame 11 via the undercover 33 is engaged with the side cover 32 has been described in the aforementioned embodiment, the foot deflector 80 may be engaged with the front cowl 31, for example, the front side cowl 43.

Although the configuration in which the foot deflector 90 supported by the engine 12 via the windshield stay 100 is not engaged with the side cover 32 has been described in the aforementioned embodiment, a configuration in which the foot deflector 90 supported by the engine 12 is engaged with the side cover 32 or the front cowl 31 may also be employed. In other words, the front cowl 31 and the side cover 32 connected to the front cowl 31 may be included, and the foot deflector 90 may be engaged with the front cowl 31 or the side cover 32 of the vehicle body cover 30. According to the configuration, it is possible to cause the foot deflector 90 and the vehicle body cover 30 to have a sense of unity.

Although the aforementioned embodiment has been described by exemplifying a motorcycle including the front wheel 13 and the rear wheel 15 as the saddle-ride vehicle 10, the invention is not limited thereto and can be applied to a three-wheeled saddle-ride vehicle including two front wheels or rear wheels and a saddle-ride vehicle including four or more wheels.

[Configuration Supported by Aforementioned Embodiments]

The aforementioned embodiments support the following configurations.

(Configuration 1) A saddle-ride vehicle in which at least a part of a side surface of an engine is exposed, the saddle-ride vehicle including: a windshield located in front of feet of a rider, in which the windshield is located on the side surface of a crankcase of the engine and is supported only by the crankcase.

With this configuration, it is possible to easily mount the windshield and to effectively reduce exposure of the rider to wind even in a saddle-ride vehicle with no cowl covering the side of the engine.

(Configuration 2) The saddle-ride vehicle according to Configuration 1, in which the windshield is supported via a windshield stay provided on the side surface of the crankcase.

With this configuration, it is possible to easily mount the windshield even in a saddle-ride vehicle with no cowl.

(Configuration 3) The saddle-ride vehicle according to Configuration 1 or 2, in which a part of the windshield is detachably supported by the windshield stay.

With this configuration, it is possible to separate the part of the windshield and to easily release a force received by the windshield in a case in which the windshield receives an external force.

(Configuration 4) The saddle-ride vehicle according to Configuration 3, in which the windshield stay is provided with attachment/detachment holes with an opening shape at which the windshield is detachably supported via a shaft member, the attachment/detachment holes include an attachment hole and a separation hole forming an opening shape that is continuous with the attachment hole and having a wider opening width than the attachment hole, and the windshield is supported by a securing member being supported by the shaft member in a state in which the shaft member is inserted into the attachment hole, the securing member being able to pass through the separation hole, the securing member being larger than the attachment hole.

With this configuration, the securing member can pass through the separation hole by the shaft member moving from the attachment hole to the separation hole, and a part of the windshield can be separated in a case in which the windshield receives an external force.

(Configuration 5) The saddle-ride vehicle according to Configuration 4, in which the securing member is a well nut.

With this configuration, it is possible to easily mount and assemble the securing member and to easily move the shaft member to the separation hole in a case in which an external force acts on the windshield since the well nut is elastically deformable.

(Configuration 6) The saddle-ride vehicle according to any one of Configurations 1 to 5, further including: a front cowl; and a side cover connected to the front cowl, in which the windshield is engaged with the front cowl or the side cover.

With this configuration, it is possible to cause the windshield and the vehicle body cover to have a sense of unity.

REFERENCE SIGNS LIST 10 saddle-ride vehicle
12 engine (power unit)
23 crankcase
23A crankcase cover (side surface)
31 front cowl
32 side cover
90 foot deflector (windshield)
100 windshield stay
110 attachment/detachment hole
110A attachment hole
110B Separation hole
111 well nut (securing member)
120 bolt (shaft member)

What is claimed is:

1. A saddle-ride vehicle in which at least a part of a side surface of an engine is exposed, the saddle-ride vehicle comprising:
   a windshield that is a foot deflector and is located in front of feet of a rider,
   wherein the windshield is located on the side surface of a crankcase of the engine and is supported only by the crankcase,
   the windshield is supported via a windshield stay provided on the side surface of the crankcase,
   a part of the windshield is detachably supported by the windshield stay, and
   the windshield stay is provided with attachment/detachment holes with an opening shape at which the windshield is detachably supported via a shaft member,
   the attachment/detachment holes include an attachment hole and a separation hole forming an opening shape that is continuous with the attachment hole and having a wider opening width than the attachment hole, and
   the windshield is supported by a securing member being supported by the shaft member in a state in which the shaft member is inserted into the attachment hole, the securing member being able to pass through the separation hole, the securing member being larger than the attachment hole.

2. The saddle-ride vehicle according to claim 1, wherein the securing member is a well nut.

* * * * *